(12) United States Patent
Bond et al.

(10) Patent No.: US 11,449,189 B1
(45) Date of Patent: Sep. 20, 2022

(54) VIRTUAL REALITY-BASED AUGMENTED REALITY DEVELOPMENT SYSTEM

(71) Applicant: Facebook Technologies, LLC, Menlo Park, CA (US)

(72) Inventors: Lars Anders Bond, San Mateo, CA (US); Francesco Georg, Mountain View, CA (US); Christopher John Ocampo, Dublin, CA (US); Michael Slater, Nottingham (GB); Stef Marc Smet, London (GB); Hannes Verlinde, Post-MSX (GB)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/591,217

(22) Filed: Oct. 2, 2019

(51) Int. Cl.
| G06F 3/04815 | (2022.01) |
| G02B 27/01 | (2006.01) |
| G06T 19/00 | (2011.01) |
| G06F 3/01 | (2006.01) |
| G06V 20/20 | (2022.01) |

(52) U.S. Cl.
CPC ....... *G06F 3/04815* (2013.01); *G02B 27/017* (2013.01); *G06F 3/011* (2013.01); *G06T 19/006* (2013.01); *G06V 20/20* (2022.01)

(58) Field of Classification Search
CPC ... G06F 3/04815; G06F 3/011; G02B 27/017; G06K 9/00671; G06T 19/006
USPC ......................................................... 345/419
See application file for complete search history.

(56) References Cited

U.S. PATENT DOCUMENTS

| 2010/0208033 | A1* | 8/2010 | Edge | G06T 19/006 |
| | | | | 348/46 |
| 2013/0083063 | A1* | 4/2013 | Geisner | G06F 3/013 |
| | | | | 345/633 |
| 2015/0040040 | A1* | 2/2015 | Balan | G06F 3/0482 |
| | | | | 715/762 |
| 2016/0247324 | A1* | 8/2016 | Mullins | G02B 27/0179 |
| 2016/0370882 | A1* | 12/2016 | McGrath | G06F 3/017 |
| 2017/0270715 | A1* | 9/2017 | Lindsay | G06T 7/70 |
| 2018/0113669 | A1* | 4/2018 | Szeto | G06F 3/1454 |
| 2018/0197624 | A1* | 7/2018 | Robaina | G16H 10/60 |
| 2018/0218538 | A1* | 8/2018 | Short | G06T 19/006 |
| 2018/0284955 | A1* | 10/2018 | Canavor | G06F 16/29 |

(Continued)

OTHER PUBLICATIONS

U.S. Appl. No. 16/506,618, filed Jul. 9, 2019, by Atlas et al.

*Primary Examiner* — Jin Ge
(74) *Attorney, Agent, or Firm* — Shumaker & Sieffert, P.A.

(57) ABSTRACT

A virtual reality (VR) system is described that enables users to create, model, and visualize augmented reality experiences at physical, real-world locations, without needing to physically be at the location for which the augmented experience is being modeled. In one example, the VR system includes a head-mounted device (HMD), an augmented reality content development system, and a rendering engine. The HMD is configured to output VR content representing a physical environment for an augmented reality experience. The augmented reality content development system is configured to identify, based on an input, augmented reality content with which to augment the physical environment for the augmented reality experience. The rendering engine is configured to render, via the HMD, the VR content representing the physical environment, augmented with the augmented reality content.

17 Claims, 16 Drawing Sheets

(56) References Cited

U.S. PATENT DOCUMENTS

| | | | |
|---|---|---|---|
| 2018/0286126 A1* | 10/2018 | Schwarz | G06F 3/04845 |
| 2018/0357826 A1* | 12/2018 | Ross | G06K 9/00671 |
| 2018/0365897 A1* | 12/2018 | Pahud | G06T 15/40 |
| 2019/0279407 A1* | 9/2019 | McHugh | G06F 3/04842 |
| 2019/0377487 A1* | 12/2019 | Bailey | G06F 3/0346 |
| 2020/0043237 A1* | 2/2020 | Desai | H04L 65/604 |
| 2020/0371673 A1* | 11/2020 | Faulkner | G06F 3/04842 |
| 2021/0034222 A1* | 2/2021 | Brems | G06F 3/167 |

* cited by examiner

VIRTUAL REALITY-BASED AUGMENTED REALITY DEVELOPMENT SYSTEM

TECHNICAL FIELD

This disclosure generally relates to artificial reality systems, such as virtual reality, and more particularly, to virtual reality-based development tools that aid in the development of augmented reality systems.

BACKGROUND

Augmented reality systems are becoming increasingly ubiquitous with applications in many fields such as health (e.g., medical training), public safety, industrial fields (e.g., repair and maintenance), education, transportation, tourism, field service, entertainment, and interactive gaming. Augmented reality systems are being incorporated into mobile devices, such as artificial reality headsets, gaming consoles, personal computers, movie theaters, and theme parks. Augmented reality represents one type of artificial reality. In general, artificial reality refers to a form of reality that has been adjusted in some manner before presentation to a user. Types of artificial reality include augmented reality (as mentioned above), as well as other types, including virtual reality, mixed reality, a hybrid reality, or some combination and/or derivative thereof.

Augmented reality systems may incorporate one or more devices configured to render and display content to users. The augmented reality content may include a combination of captured content (e.g., real-world video and/or image data) combined with generated content. During operation, the user may also interact with the augmented reality system and effect modifications to the augmented reality content being rendered and displayed.

SUMMARY

In general, this disclosure describes an augmented reality development system and framework that enables users (authors, developers, artists, designers, etc.) to model and visualize augmented reality experiences at physical, real-world locations using one or more virtual reality (VR) systems to simulate the experience. The VR-based augmented reality development system of this disclosure enables the user to visualize and evaluate developed content or in-development content for an augmented reality experience with respect to real-world physical locations in a full, immersive manner without the user needing to physically be at the location at which the experience is being or will be augmented with computer-generated content.

As such, in some examples described herein, the systems and techniques enable creation of augmented reality in virtual reality environments, thus allowing the developer to fully interact with and experience the environment for which the developer is creating the augmented reality content. This may allow the developer to feel more natural so as to more readily appreciate and understand the actual effects of the augmented reality content once rendered with respect to a particular real-world environment. The developer may, for example, more readily feel as if he or she is at the physical world location being augmented as the developer is creating the augmented reality content.

The VR-based augmented reality content development system of this disclosure, in some examples, enables multiple users to collaborate on the augmented reality content development using multiple VR units, in either a synchronous manner (e.g., by contemporaneously working on a shared workspace) or in an asynchronous manner (e.g. by enabling a prior author to annotate the environment to instruct a subsequent author on development tasks).

The augmented reality content development system of this disclosure presents a VR environment utilizing the one or more VR units. The presented VR environment incorporates augmented content development capabilities as well as compilation and/or execution functions, and thereby enables the authors to develop and refine an augmented reality experience from directly within a VR experience simulating a real-world environment. In some examples, the VR-based augmented reality development system of this disclosure enables simulations of different factors and characteristics that may influence the end-user's experience, such as various environmental factors (e.g., location, viewing perspective/angle, time of day, seasonal changes, weather, lighting conditions) and/or simulated end-user hardware and software platforms.

In one example, this disclosure is directed to a virtual reality (VR) system. The VR system includes a head-mounted device (HMD), an augmented reality content development system, and a rendering engine. The HMD is configured to output VR content representing a physical environment for an augmented reality experience. The augmented reality content development system is configured to identify, based on an input, augmented reality content with which to augment the physical environment for the augmented reality experience. The rendering engine is configured to render, via the HMD, the VR content representing the physical environment, augmented with the augmented reality content.

In another example, this disclosure is directed to an apparatus. The apparatus includes means for outputting VR content representing a physical environment for an augmented reality experience. The apparatus further includes means for identifying, based on an input, augmented reality content with which to augment the physical environment for the augmented reality experience. The apparatus further includes means for rendering, via a head-mounted device (HMD), the VR content representing the physical environment, augmented with the augmented reality content.

In another example, this disclosure is directed to a method. The method includes receiving, by an augmented reality content development system, one or more parameters associated with an augmented reality experience to be simulated. The method further includes outputting, by a head-mounted device (HMD), based on the received one or more parameters, virtual reality (VR) content simulating the augmented reality experience. The method further includes receiving, by the augmented reality content development system, input indicating one or more modifications to the augmented reality experience simulated by the VR content output by the HMD. The method further includes updating, by the augmented reality system, based on the received input, the VR content to form updated VR content. The method further includes outputting, by the HMD, the updated VR content to simulate the modified augmented reality experience.

In another example, this disclosure is directed to a non-transitory computer-readable storage medium encoded with instructions. The instructions, when executed, cause processing circuitry of a virtual reality (VR) system to receive, via an augmented reality content development system of the VR system, one or more parameters associated with an augmented reality experience to be simulated, to output, via a head-mounted device (HMD) of the VR system, based on the received one or more parameters, virtual reality (VR) content simulating the augmented reality experience, to receive, via the augmented reality content development system, input indicating one or more modifications to the augmented reality experience simulated by the VR content output via the HMD, to update, using the augmented reality system, based on the received input, the VR content to form updated VR content, and to output, via the HMD, the updated VR content to simulate the modified augmented reality experience.

The systems of this disclosure provide one or more technical advantages. For example, by providing a VR environment that simulates a real-world setting at which an augmented reality experience may be created in the future, the systems of this disclosure enable the user(s) to configure the augmented reality parameters from a dedicated development environment, rather than needing to create a development environment physically at the real-world setting. As another example, by enabling VR-based augmented reality development, the systems of this disclosure enable multiple users to collaborate on the development process, even if the multiple users perform their respective development tasks from different locations. As another example still, the VR-based augmented reality development system enables the users to simulate image capture idiosyncrasies of specific augmented reality devices, thereby providing the users with information that may be used to fine-tune the precision of potential future augmented reality experiences by potential end-users of various augmented reality-equipped hardware platforms.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
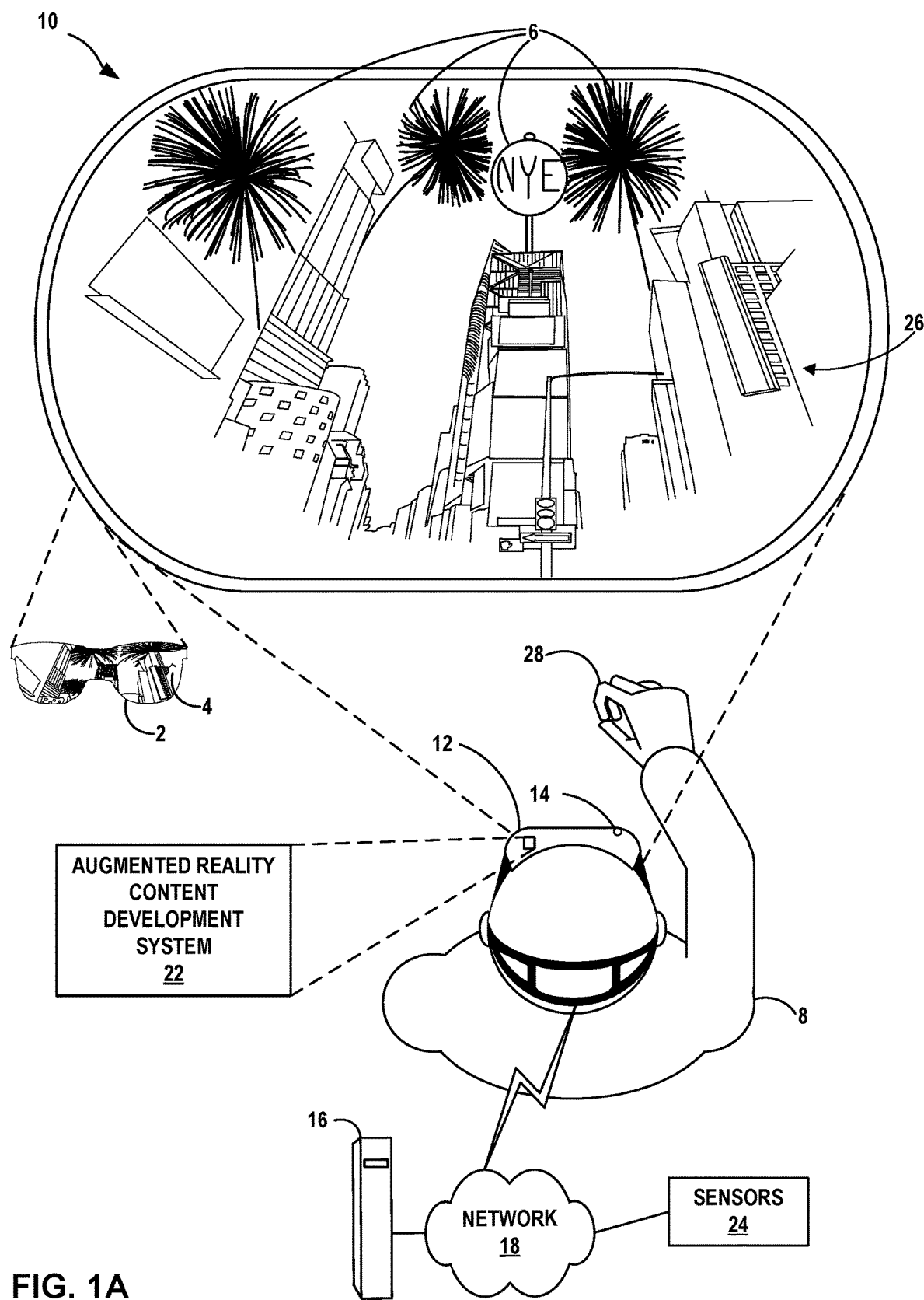
FIGS. 1A and 1B are illustrations depicting example systems that present and control user interface elements within a virtual reality (VR) environment to facilitate development of augmented reality experiences, in accordance with the techniques of the disclosure.
Figure 1B:
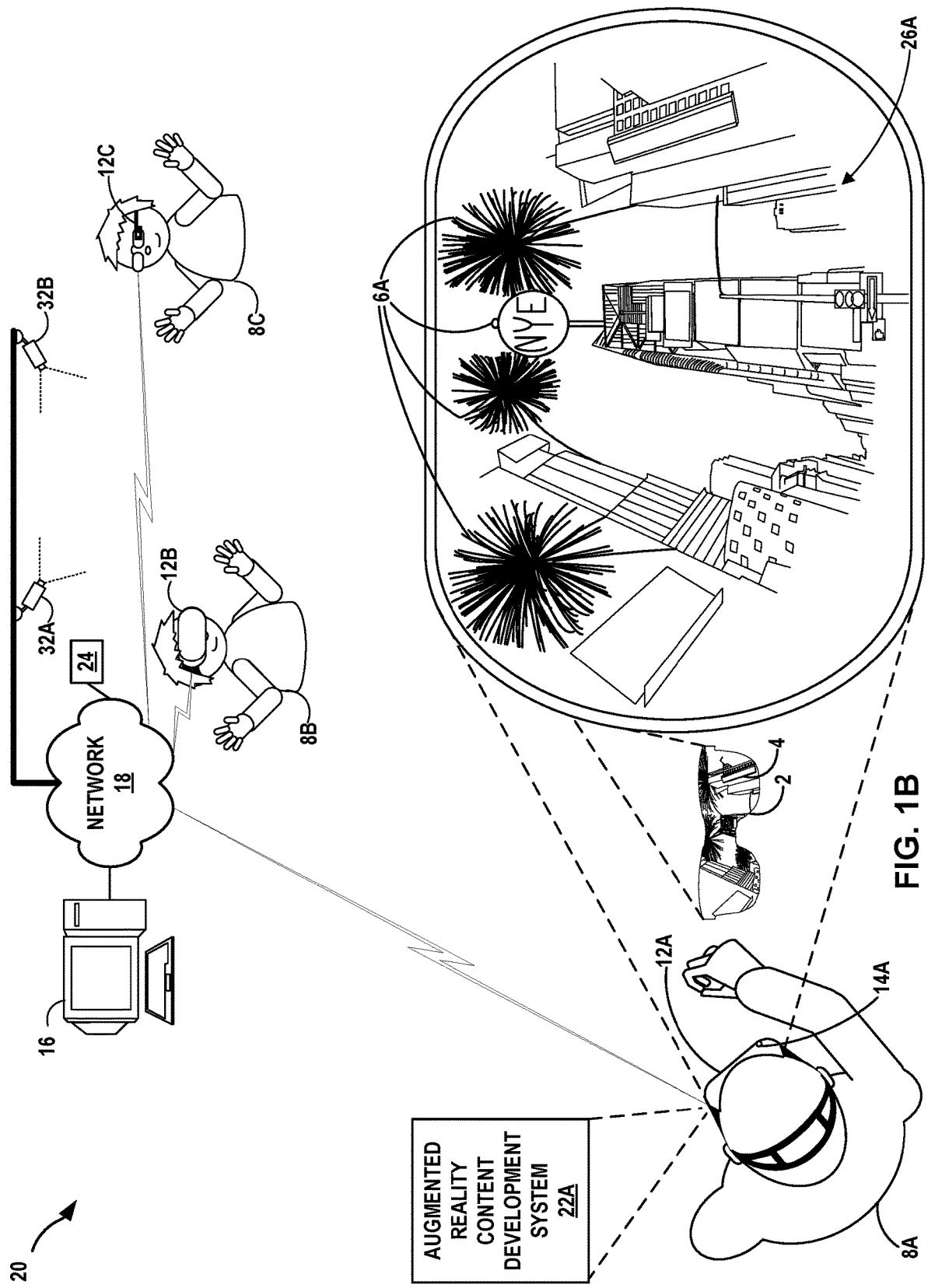

FIGS. 1A and 1B are illustrations depicting example systems that present and control user interface elements within a virtual reality (VR) environment to facilitate development of augmented reality experiences for a given physical environment, in accordance with the techniques of the disclosure. FIG. 1A is an illustration depicting VR system 10 that presents and controls user interface elements of an integrated development environment for augmented reality experiences, in accordance with the techniques of the disclosure. In some example implementations, VR system 10 implements an augmented reality development studio that enables developer 8 to create augmented reality content for a physical environment and visualize the effect of the augmented reality content using a simulated VR experience provided by VR system 10. Moreover, in some examples, VR system 10 provides a fully immersive, interactive augmented reality development framework in that generates and renders display elements, including, but not limited to, graphical user interface (GUI) elements, with which developer 8 fully interact with and experience the environment for which the developer is creating the augmented reality content. This may allow developer 8 to feel more natural so as to more readily appreciate and understand the actual effects of the augmented reality content once rendered with respect to a particular real-world environment. Developer 8 may, for example, more readily feel as if he or she is at the physical world location being augmented as the developer is creating the augmented reality content.

As such, VR system 10 may generate and render augmented reality content having display elements, including, but not limited to, graphical user interface (GUI) elements, with which developer 8 interacts to develop augmented reality content while experiencing and interacting with a VR environment presented by VR system 10. VR system 10 may modify or update the GUI elements in response to inputs provided by developer 8. Developer 8 may provide the inputs in various ways, including by performing gestures with hand 28 (or one or more digits thereof), or by providing input through other input devices, such as physical or virtual keyboards, mice, etc. Some GUI elements that VR system 10 may present as components of an augmented reality studio for creating augmented reality content and are specifically designed for user interaction and manipulation within a VR environment, such as specialized toggle elements, drop-down elements, menu selection elements, content display windows, and the like.

In the example of FIG. 1A, VR system 10 includes head mounted device (HMD) 12, console 16 and, in some examples, one or more external sensors 24. As shown, HMD 12 is typically worn by developer 8 and includes an electronic display and optical assembly for presenting VR content 26 to developer 8. In addition, HMD 12 includes one or more sensors (e.g., accelerometers) for tracking motion of the body of HMD 12, and may include one or more image capture devices 14, e.g., cameras, line scanners, and the like, for capturing image data of the surrounding physical environment.

In the example of FIG. 1A, console 16 is shown as a single computing device, such as a gaming console, a workstation, a desktop computer, or a laptop computer. In other examples, console 16 may be distributed across a plurality of computing devices, such as a distributed computing network, a data center, or a cloud computing system. Console 16, HMD 12, and sensors 24 may, as shown in this example, be communicatively coupled via network 18, which may be a wired or wireless network, such as a mesh network or a short-range wireless communication medium. Although HMD 12 is shown in this example as being in communication, e.g., tethered to or in wireless communication with, console 16, in some implementations HMD 12 operates as a stand-alone, portable VR system.

In general, VR system 10 uses information captured from a real-world, 3D physical environment to render VR content 26 for display to developer 8. The real-world, 3D physical environment may represent a geographical location that is remote from the location at which HMD 12 is presently positioned. In the example of FIG. 1A, developer 8 may view VR content 26 as constructed and rendered by augmented reality content development system 22 executing, in this example, on HMD 12. While augmented reality content development system 22 is shown in FIG. 1A as being implemented as part of HMD 12, it will be appreciated that all or components of augmented reality content development system 22 may be implemented, in various other examples, as part of console 16 or as part of a peripheral device that is communicatively coupled to HMD 12 or to both HMD 12 and console 16. In some examples, augmented reality content development system 22 may be implemented as a distributed, modular development studio with components executing on any of console 16 and HMD 12.

In general, augmented reality content development system 22 provides a full-featured content development studio for creating augmented reality content for real-world environments. That is, augmented reality content development system 22 may include various components including a content editor that allows developer 8 to: (i) build visual effects including adding an editing augmented reality objects, (ii) scaling and positioning augmented reality objects within a 3D environment, (iii) creating and configuring layers for placing objects in front of or behind other objects, (iv) rotating and repositioning objects, (v) creating and controlling placement of animations within the 3D environment, (vi) creating textures, materials and/or meshes for surfaces within the 3D environment, and (vii) creating and defining augmented reality elements for interacting with a user. In addition, augmented reality content development system 22 includes a VR-based augmented reality simulator that enables developer 8 or another user to preview and experience the effects by processing augmented reality content to construct and render a VR experience for display by HMD 12 as VR content 26 that simulates the authored augmented reality experience on a target real world environment.

In this way, as one example, augmented reality content development system 22 may be implemented as a fully integrated development environment (IDE) that enables developer 8 to author augmented reality content 6 and experience the effects as VR content 26. Augmented reality content development system 22 may be implemented in hardware, in firmware, or in a combination of hardware and software. As non-limiting examples, augmented reality content development system 22 may be implemented by a multi-core processor, a controller, a digital signal processor (DSP), an application specific integrated circuit (ASIC), a field-programmable gate array (FPGA), fixed function circuitry, programmable processing circuitry, a combination of fixed function circuitry and programmable processing circuitry, or equivalent discrete or integrated logic circuitry. Augmented reality content development system 22 may store data to or access data from one or more forms of memory for storing data and executable instructions, such as random-access memory (RAM), read only memory (ROM), programmable read only memory (PROM), erasable programmable read only memory (EPROM), electronically erasable programmable read only memory (EEPROM), and flash memory.

In some use cases, augmented reality content development system 22 may render developer 8 and/or a hypothetical end-user of the augmented reality system in the simulated augmented reality location under development as an avatar. In the example of FIG. 1A, augmented reality content development system 22 renders VR content 26 and supplements VR content 26 with augmented reality content that an end-user might potentially view as part of an augmented reality experience at the physical environment represented by VR content 26. During the development process, augmented reality content development system 22 may overlay or superimpose augmented reality content 6 as additional GUI elements over portions of VR content 26. By overlaying augmented reality content 6 over VR content 26 in this way, augmented reality content development system 22 may provide developer 8 a simulation of the visual output of an augmented reality device positioned at the physical environment represented by VR content 26, during a future augmented reality experience of an end-user at the physical environment represented by VR content 6.

In this example, FIG. 1A shows the GUI elements of VR content 26 and the GUI elements of augmented reality content 6 using different line thicknesses, purely to distinguish VR content 26 from augmented reality content 6 visually. It will be appreciated that, in actual operation, augmented reality content development system 22 may render VR content 26 and augmented reality content 6 to more closely reflect the physical environment represented by VR content and the augmented reality GUI elements and, in some examples, based on a target hardware modality that forms the basis of the augmented reality tools presently under development, and that the visual distinctions between VR content 26 and augmented reality content 6 need not necessarily appear as shown in FIG. 1A.

In some implementations, augmented reality content development system 22 may generate VR content 26 having augmented reality content 6 to accurately simulate the visual output of various target types of augmented reality devices, such as augmented reality glasses, tablet computers, smartphones, augmented reality goggles, etc. For instance, augmented reality content development system 22 may tune the field of view (FoV), color information, light filtering, and other visual characteristics of VR content 26 and/or augmented reality content 6 based on the capability set of a hardware modality selected by developer 8 during or before the development process.

FIG. 1A is described herein with respect to the non-limiting example of augmented reality content development system 22 generating VR content 26 having augmented reality content 6 so as to accurately represent and simulate a future user's experience when using augmented reality glasses 2. That is, FIG. 1A illustrates one example of developer 8 creating augmented reality content targeted for augmented reality glasses 2, where VR content 26 is constructed and rendered to allow developer 8 to experience a VR environment that simulates an augmented reality experience 4 of a future user. In this way, VR content 26 models or projects the end-user's augmented reality experience at the physical environment when using the augmented reality glasses 2, thereby providing developer 8 a fully immersive development experience when creating augmented reality experiences.

In FIG. 1A, augmented reality experience 4 represents the augmented reality experience of a future user of augmented reality glasses 2 and, as such, includes real-world imagery simulated by VR content 26 along with artificial objects of augmented reality content 6, as created by developer 8, that the end-user might hypothetically view as part of an augmented reality experience at the physical environment represented by VR content 26. Thus, augmented reality experience 4 may represent various target end uses of the augmented reality experience under development, such as navigation, educational training, professional training, simulated scenarios, or other types of applications that could utilize augmented reality as a tool.

During operation, augmented reality content development system 22 constructs VR content 26 for display to developer 8 at least in part by tracking and computing pose information for a frame of reference, typically a viewing perspective of HMD 12. Using HMD 12 as a frame of reference, and based on a current field of view (FoV) as determined by a current estimated pose of HMD 12, augmented reality content development system 22 renders VR content 26 in perspectives that at least partially replicate the end user's FoV at the physical environment shown in VR content 26.

During this process, augmented reality content development system 22 uses sensed data received from HMD 12 and/or external sensors 24, such as head, neck, or body movement information, eye movement information, user commands, and, in some examples, data from any external sensors 24, such as external cameras, to capture 3D information within the real world, physical environment simulated in VR content 26. Based on the sensed data, augmented reality content development system 22 determines a current pose for the frame of reference of HMD 12 and, in accordance with the current pose, renders the VR content 26 at a particular perspective that suits the current pose and/or FoV of developer 8.

Also based on the sensed data, augmented reality content development system 22 may detect gestures performed by developer 8 and generate or modify GUI elements or IDE elements of VR content 26 in response to detecting particular gestures. For example, augmented reality content development system 22 may change the hardware modality that forms the basis of augmented reality simulation 6 between such examples as augmented reality glasses (as in the case of FIG. 1A), tablet computer, smartphone, etc. based on detecting a touch gesture or other gesture performed by hand 28 on a menu.

As another example, augmented reality content development system 22 may add, edit, or delete text annotations or free form annotations superimposed over VR content 26 in response to detecting typing or dragging gestures performed by hand 28 at locations corresponding to virtual input elements such as a virtual keyboard, a virtual pen, a virtual eraser, etc. within VR content 26. While depicted in a two-dimensional format in FIG. 1A for ease of illustration purposes, VR content 26 (with or without the overlay of augmented reality content 6) may represent two-dimensional or three-dimensional content that is manipulatable by developer 8 or adjustable by augmented reality content development system 22 such that VR content 26 can be translated, scaled, and/or rotated to suit the preference or the FoV of developer 8 during the augmented reality development process, as may be determined using real-time gaze tracking or via other techniques.

In this way, augmented reality content development system 22 uses gaze-tracking and pose detection capabilities of image capture devices 14 (e.g., inward-facing cameras) and/or external sensors 24 to determine the position and the FoV of developer 8 with respect to the physical environment represented by VR content 26. By adjusting (e.g. by vertically or horizontally panning) VR content 26 (and optionally, augmented reality content 6, if it has been superimposed already) in response to detecting FoV or position changes of developer 8, augmented reality content development system 22 enables developer 8 to develop augmented reality tools based on relatively accurate projections of a future augmented reality experience at the physical environment represented by VR content 26.

By simulating a future augmented reality experience using VR content 26 including the overlay of augmented reality content 6, augmented reality content development system 22 improves the precision of the augmented reality tools under development. That is, augmented reality content development system 22 enables developer 8 to execute the hypothetical augmented reality experience from the perspective of the end user via VR content 26, thereby enabling a more accurate development process.

Moreover, augmented reality content development system 22 implements the techniques of this disclosure to improve the precision of all aspects of the augmented reality development process, such as the coding, the graphics, etc. As such, developer 8 may represent one of various participants in the augmented reality development process, such as a coder, a tester, a quality assurance (QA) personnel member, a graphic designer, a digital artist, an author/documenter, etc.

FIG. 1B is an illustration depicting another example VR system 20 in accordance with aspects of the disclosure. In contrast to VR system 10 of FIG. 1A, which is an example of the systems of this disclosure in a single-developer context, VR system 20 of FIG. 1B illustrates the systems of this disclosure in a multi-developer context. VR system 20 may, in some examples, represent a collaborative VR-based augmented reality development suite.

In the example of FIG. 1B, VR system 20 includes external cameras 32A and 32B (collectively, "external cameras 32"), HMDs 12A-12C (collectively, "HMDs 12"), console 16, and sensors 24. In the multi-developer environment represented by VR system 20, augmented reality IDEs executing on console 16 and/or HMDs 12 present respective VR content (optionally, with augmented reality content overlays) to each of developers 8A-8C (collectively, "developers 8") based on a current viewing perspective of a corresponding frame of reference for the respective developer 8 and based on the parameters and present development state of the augmented reality tool with respect to a target physical location and, optionally, target future augmented reality viewing devices, such as augmented reality glasses 2. That is, in the example of FIG. 1B, each of developers 8 may contribute to the development of the augmented reality tool, by providing input via respective HMDs 12 and/or combinations of respective HMDs 12 with respective peripheral devices communicatively coupled to the respective HMDs 12.

VR system 20 uses data received from HMDs 12, and optionally, data received from cameras 32, to capture development input from developers 8 to enable collaborative development of the augmented reality tool(s). Each of HMDs 12 implements a respective augmented reality development system, and outputs respective VR content, although only augmented reality content development system 22A of HMD 12A (and VR content 26A with augmented reality content 6A output by HMD 12A) are shown in FIG. 1B, purely for the purpose of ease of illustration. As shown in FIG. 1B, two or more of HMDs 12 may, but need not necessarily, conform to the same form factor. Various form factors of HMDs 12 are shown in FIG. 1B, including a goggle form factor and an eyeglass form factor.

Two or more of developers 8 may collaborate on the development of augmented reality tools, using VR system 20. VR system 20 enables any of fully synchronous (contemporaneous) collaboration, partially synchronous collaboration, asynchronous collaboration, or a combination asynchronous and synchronous collaboration. In an example of synchronous collaboration, developer 8A and developer 8B may use VR system 20 during partially overlapping or fully overlapping time frames to perform their respective development tasks with respect to the augmented reality tool being developed. In an example of asynchronous collaboration, developer 8C may perform his/her development tasks at a time that does not overlap at all with either of developers 8A or 8B performing their respective development tasks. In an example of an synchronous/asynchronous combination, developers 8A and 8B may use VR system 20 in a partially or fully overlapping manner, and developer 8C may use VR system 20 at a later time, when developers 8A and 8B are not actively using VR system 20.

VR system 20 enables and enhances the asynchronous collaboration aspects of this disclosure by incorporating annotation capabilities in each of augmented reality content development systems 22. For example, developer 8A may use augmented reality content development system 22A to embed or overlay various types of annotations with respect to VR content 26A. The annotations may take various forms, such as text overlay (e.g., provided via a graphical keyboard or graphical pen with the aid of handwriting recognition), free form overlay (e.g., provided via a graphical pen), programming comment statements, etc. Any of developers 8 may consult the annotations at a later time, in performing their respective development tasks. In this way, the annotation capabilities provided by augmented reality content development systems 22 enables developers 8 to improve the precision of the augmented reality tool being developed by maintaining continuity and by enhancing inter-developer communication during the development process.

In the use case scenario illustrated in FIGS. 1A and 1B, VR content 26 presented to each developer 82 (e.g., VR content 26A presented to developer 8A) simulates a future augmented reality experience 4 as viewed by a future user wearing augmented reality glasses 2. In this example, VR content 26 simulates the experience of an end user who is in a city area, and is generating an augmented reality experience for a New Year's Eve celebration in the city at a different time and wearing a particular target augmented reality device, i.e., augmented reality glasses 2 in this example. For instance, augmented reality content development systems 22 may generate VR content 26 to reflect the city during the daytime on a day other than New Year's Eve. In this example, augmented reality content development systems 22 generates augmented reality content 6 to reflect New Year's Eve ornamentation and fireworks that the end user of the augmented reality tool may use to supplement the real-world view at the city to simulate a New Year's Eve celebration at the same location, at a different time. In some examples, augmented reality content development systems 22 may adjust the background lighting of VR content to account for changes in daylight, may add or remove ephemeral lighting owing to the fireworks simulated in augmented reality content 6, etc.

Although VR systems 10 and 20 are described above as being used by developers 8 to develop augmented reality tools, it will be appreciated that non-developer users may also avail of the functionalities provided by augmented reality content development systems 22. For example, potential users of the augmented reality tools may test the tools by utilizing augmented reality content development systems 22 as execution environments, to simulate the augmented reality experiences that could be experienced by acquiring the augmented reality tools and/or the specific hardware modalities (e.g., augmented reality glasses) that implement the augmented reality tools being simulated. As such VR systems 10 and 20 may serve as development environments, testing environments (that can be used at various checkpoints), simulation environments, or the like.

Figure 2A:
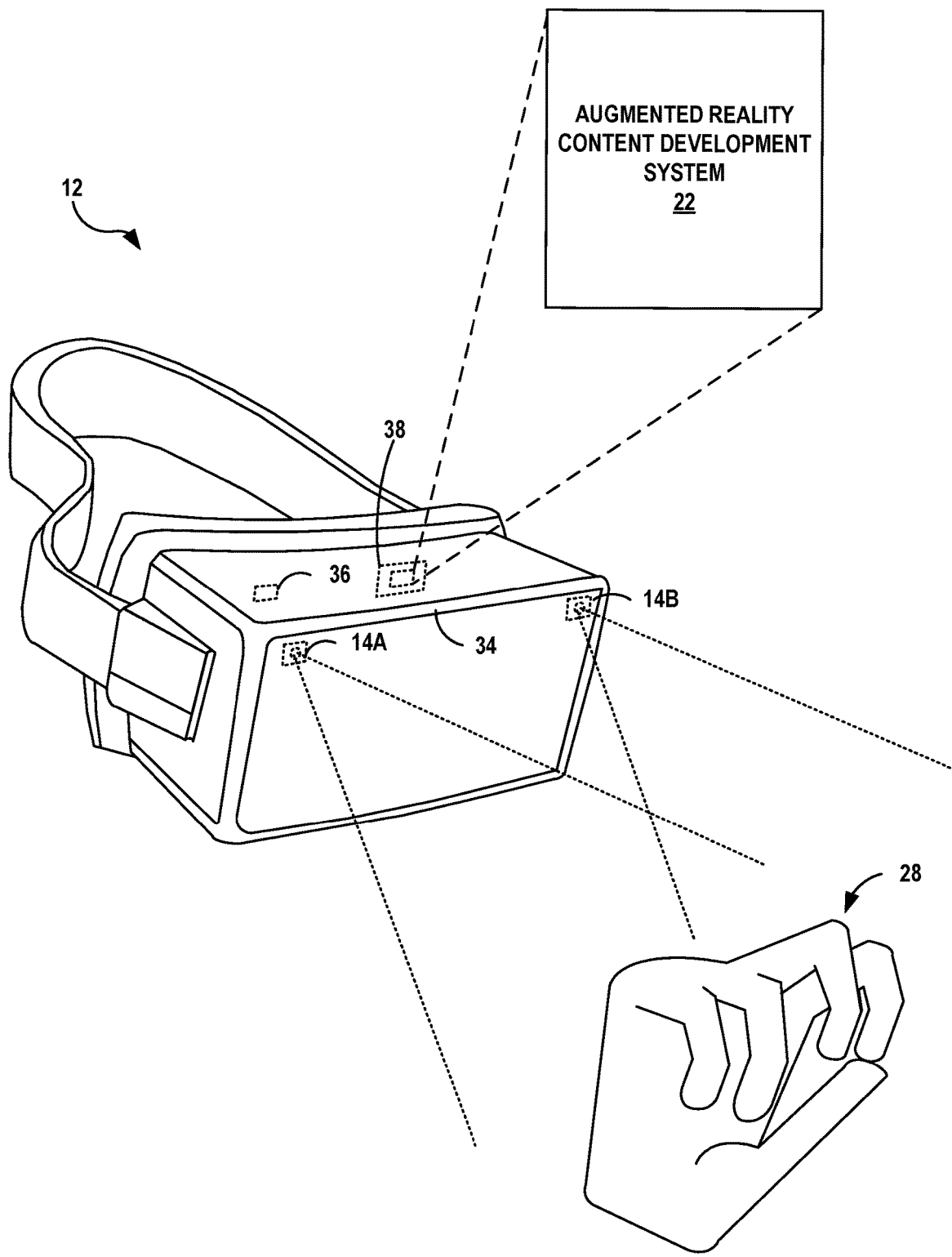
FIGS. 2A-2C are illustrations depicting examples of head-mounted devices (HMDs) that operate in accordance with the VR-based augmented reality development systems of this disclosure.
Figure 2B:
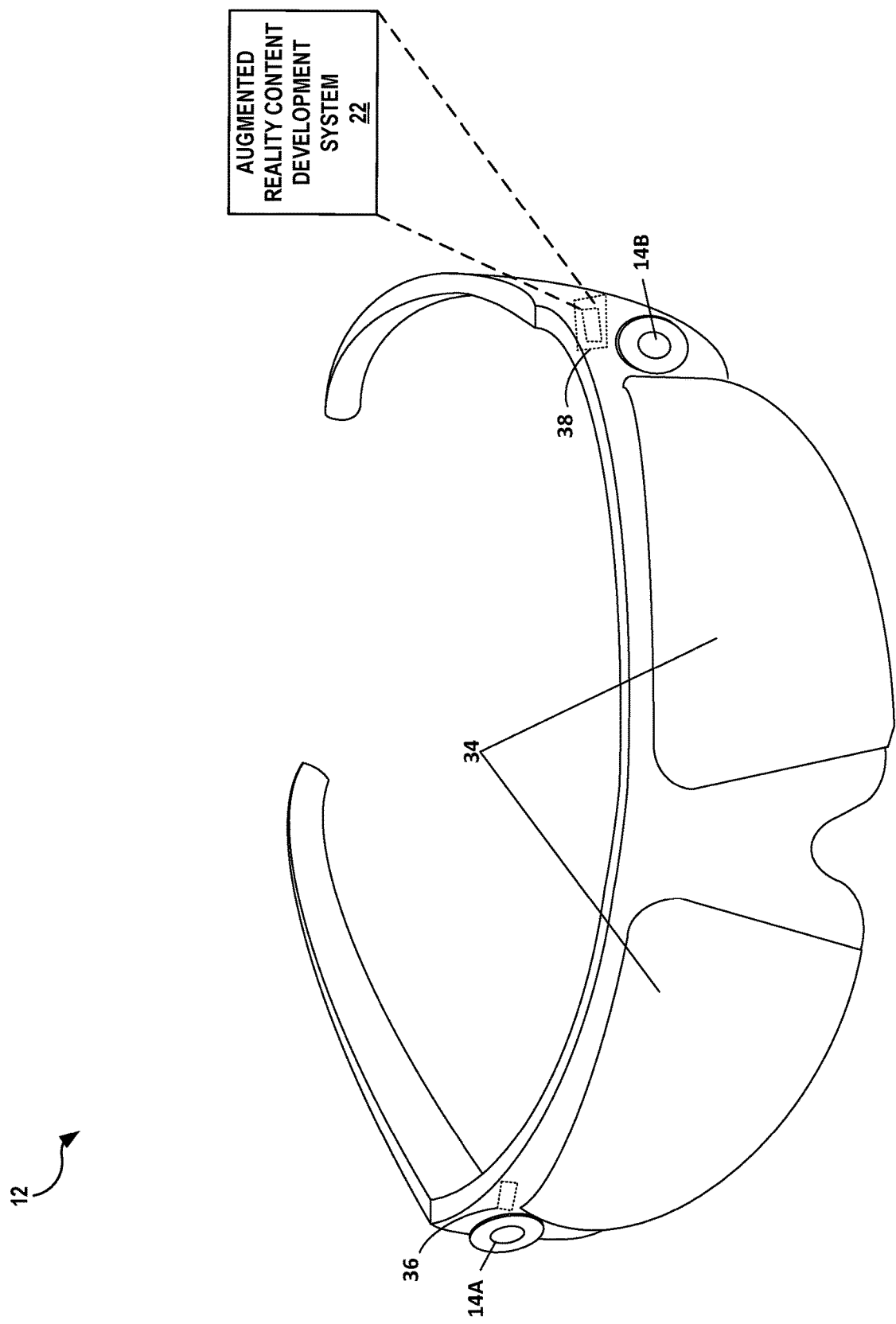
Figure 2C:
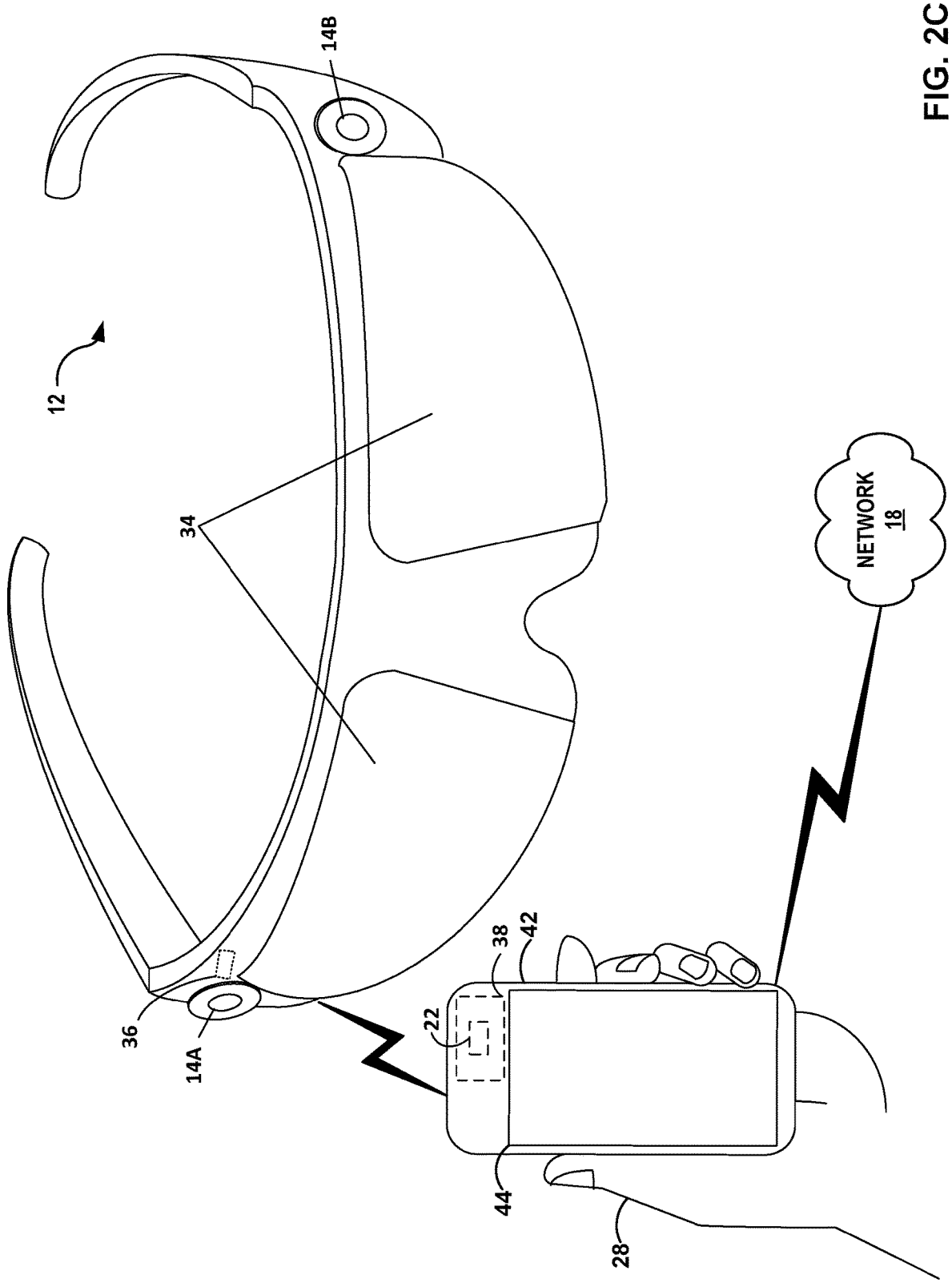

FIGS. 2A-2C are illustrations depicting examples of head-mounted devices (HMDs) that operate in accordance with the VR-based augmented reality development systems of this disclosure. FIG. 2A is an illustration depicting an example HMD 12 configured to render and modify VR content that can be used to develop and model augmented reality experiences, in accordance with the techniques of the disclosure. HMD 12 of FIG. 2A may be an example of any of HMDs 12 of FIGS. 1A and 1B. HMD 12 may be part of a VR system, such as VR systems 10 and 20 of FIGS. 1A and 1B, or may operate as a stand-alone, mobile artificial realty system configured to implement the techniques described herein. In the example of FIG. 2A, HMD 12 takes the general form factor of a headset or goggles.

In this example, HMD 12 includes a front rigid body and a band to secure HMD 12 to a user, such as to one of developers 8. In addition, HMD 12 includes an interior-facing electronic display 34 configured to present artificial reality content to the user. Electronic display 34 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of developer 8. In some examples, the known orientation and position of display 34 relative to the front rigid body of HMD 12 is used as a frame of reference, also referred to as a local origin, when tracking the position and orientation of HMD 12 for rendering artificial reality content according to a current viewing perspective of HMD 12 and developer 8.

As further shown in FIG. 2A, in this example, HMD 12 further includes one or more motion sensors 36, such as one or more accelerometers (also referred to as inertial measurement units or "IMUs") that output data indicative of current acceleration of HMD 12, GPS sensors that output data indicative of a location of HMD 12, radar, or sonar that output data indicative of distances of HMD 12 from various objects, or other sensors that provide indications of a location or orientation of HMD 12 or other objects within a physical environment. Moreover, HMD 12 may include integrated image capture devices 134A and 134B (collectively, "image capture devices 134"), such as video cameras, laser scanners, Doppler® radar scanners, depth scanners, or the like, configured to output image data representative of the physical environment.

FIG. 2B is an illustration depicting another example of HMD 12 configured to render and modify VR content that can be used to develop and model augmented reality experiences, in accordance with the techniques of the disclosure. HMD 12 of FIG. 2B may be an example of any of HMDs 12 of FIGS. 1A and 1B. HMD 12 may be part of a virtual reality system, such as VR systems 10 and 20 of FIGS. 1A and 1B, or may operate as a stand-alone, mobile artificial realty system configured to implement the techniques described herein. In the example of FIG. 2B, HMD 12 takes the general form factor of glasses.

In this example, HMD 12 includes a front rigid body and two stems to secure HMD 12 to developer 8, e.g., by resting over the ears of developer 8. In addition, HMD 12 includes an interior-facing electronic display 34 configured to present artificial reality content to the user. Electronic display 34 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, electronic display 34 is a stereoscopic display for providing separate images to each eye of the user. In some examples, the known orientation and position of display 34 relative to the front rigid body of HMD 12 is used as a frame of reference, also referred to as a local origin, when tracking the position and orientation of HMD 12 for rendering VR content that emulates a physical location at which a future augmented reality experience may occur, according to a current viewing perspective of HMD 12 and developer 8.

Electronic display 34 may be split into multiple segments, such as into two segments, with each segment corresponding to a separate lens disposed on the rigid front body of HMD 12 in the example of FIG. 2B. In other examples, electronic display 34 may form a contiguous surface that spans both lenses and the lens-connecting bridge (i.e., the over-the-nose portion) of the rigid front body of HMD 12 in the example of FIG. 2B. In some examples, electronic display 34 may also encompass portions of HMD 12 that connect the lenses of the front rigid body to the stems, or optionally, portions of the stems themselves, in the example form factor illustrated in FIG. 2B. These various designs of electronic display 34 in the context of the form factor of HMD 12 shown in FIG. 2B improve accessibility for users having different visual capabilities, eye movement idiosyncrasies, etc. Elements of FIG. 2B that share reference numerals with elements of FIG. 2A perform like-functionalities, and are not described separately with respect to FIG. 2B for the sake of brevity.

In the examples illustrated in FIGS. 2A & 2B, control unit 210 of HMD 12 includes augmented reality content development system 22 illustrated in FIGS. 1A & 1B. Control unit 38 may, for example, comprise any combination of one or more processors, one or more field programmable gate arrays (FPGAs), one or more application specific integrated circuits (ASICs), and one or more application specific standard products (ASSPs). Control unit 38 may also comprise memory, both static (e.g., hard drives or magnetic drives, optical drives, FLASH memory, EPROM, EEPROM, etc.) and dynamic (e.g., RAM, DRAM, SRAM, etc.), or any other non-transitory computer readable storage medium capable of storing instructions that cause the one or more processors to control augmented reality content development system 22 (e.g., by controlling timing or other operational parameters) to perform the efficient network management techniques described in this disclosure.

Thus, control unit 38 may represent hardware or a combination of hardware and software to support the below described components (e.g., augmented reality content development system 22), modules, elements, or operations. In examples in which augmented reality content development system 22 is formed as an integrated circuit (IC), augmented reality content development system 22 represents a "development IC." As such, the term "development IC" is used at various parts of this disclosure interchangeably with augmented reality content development system 22.

FIG. 2C is an illustration depicting an example HMD 12 in communication with an example peripheral device 42 that provides the VR-based augmented reality development functionalities described in this disclosure. HMD 12 of FIG. 2C may be an example of any of HMDs 12 of FIGS. 1A and 1B, and takes the form factor of glasses, as in the case of HMD 12C of FIG. 1B and HMD 12 of FIG. 2B. HMD 12 may be part of a VR system, such as VR systems 10 and 20 of FIGS. 1A, 1B, or may operate as a stand-alone, mobile VR system configured to implement the techniques described herein. In the example of FIG. 2C, image capture devices 14 may capture image data representative of various objects, including peripheral device 42 and/or hand 28 in the physical environment that are within the FoV of image capture devices, which may generally correspond to the viewing perspective of HMD 12.

In the example of FIG. 2C, control unit 38 is implemented in peripheral device 42, which, in turn, is communicatively coupled to HMD 12. Control unit 38 implements augmented reality content development system 22, which may generate and render VR content 26 for display on electronic display 34. Augmented reality content development system 22 may generate and render VR content 26 to emulate the physical location at which an augmented reality experience currently under development may occur. Augmented reality content development system 22 may also generate and render VR content 26 to include augmented reality simulation 6 shown in FIGS. 1A and 1B, thereby enabling developer 8 to model the compiled and executed status of the augment reality tool at various development milestones.

Surface 44 represents an input component or a combined input/output component of peripheral device 42. Surface 44 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 44 may enable peripheral device 42 to receive touch input or gesture input without direct contact surface 44. Developer 8 may provide these touch or gesture inputs to peripheral device 42 to provide instructions to augmented reality content development system 22 in developing augmented reality tools, in accordance with aspects of this disclosure. In some examples, processing circuitry of HMD 12 may utilize image capture devices 14 to analyze configurations, positions, movements, and/or orientations of peripheral device 42, of hand 28 to enable developer 8 to edit VR content 26 based on gestures such as drawing gestures or typing gestures provided via a graphical keyboard.

Peripheral device 42 can communicate input to HMD 12 (and/or console 16) using wireless communications links (e.g., Wi-Fi™, near-field communication of short-range wireless communication such as Bluetooth®), or using wired communication links, or combinations thereof, or using other types of communication links. In the example of FIG. 2C, peripheral device 42 is also communicatively coupled to network 18, thereby enabling peripheral device 42 to upload code to cloud storage and/or to enable collaborative development as in the example of FIG. 1B. In this way, peripheral device 42 may offload various hardware and resource burdens from HMD 12, which enables low-profile form factor designs of HMD 12. Peripheral device 42 also serves as a communications intermediary between HMD 12 and devices at remote locations, via network 18. Further details of peripheral device 42 are described in U.S. patent application Ser. No. 16/506,618 (filed on 9 Jul. 2019), the entire content of which is incorporated herein by reference.

Figure 2D:
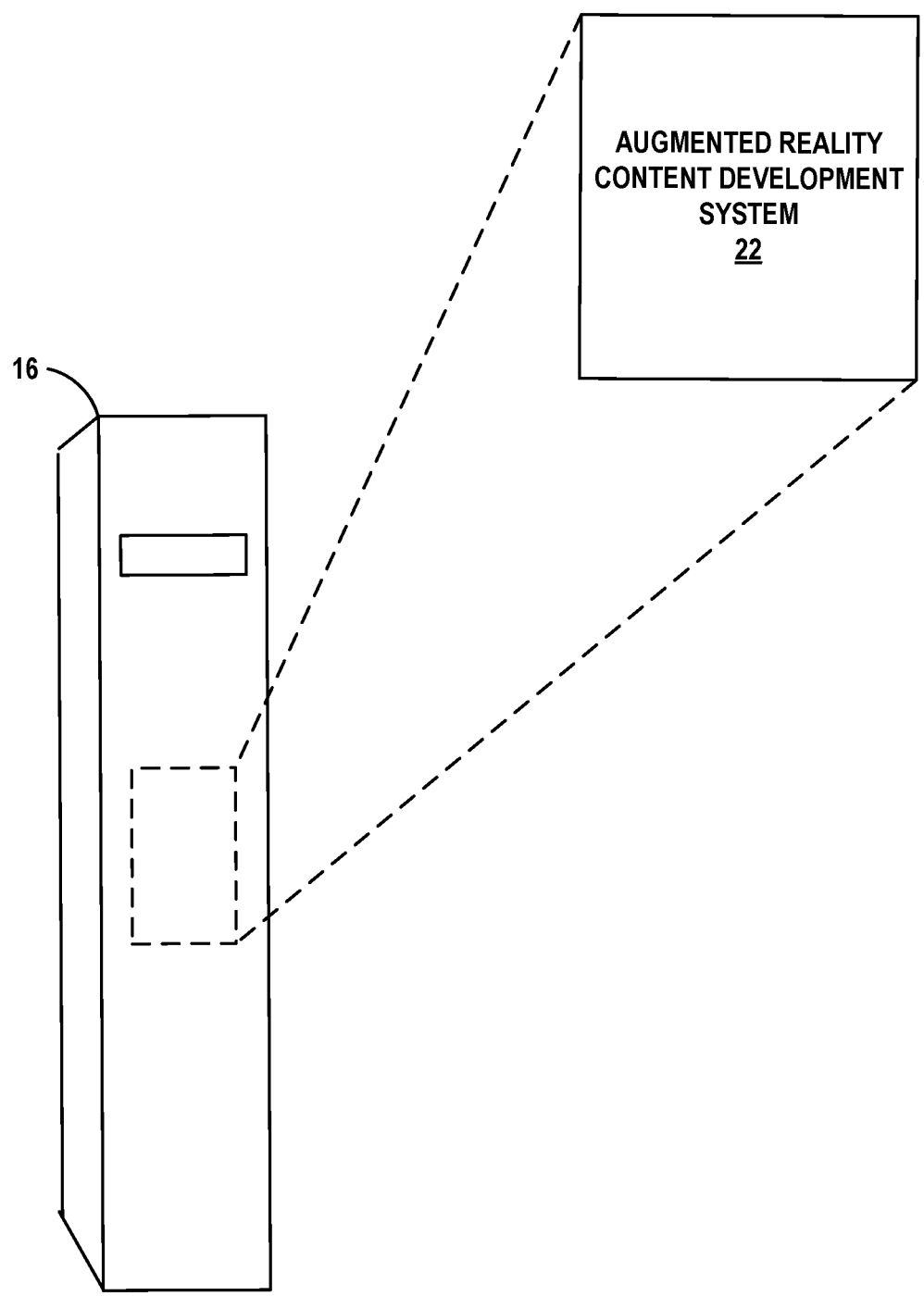
FIG. 2D is an illustration depicting an example of a console that operates in accordance with the VR-based augmented reality content development systems of this disclosure.

FIG. 2D is an illustration depicting an example of a console that operates in accordance with the VR-based augmented reality content development systems of this disclosure. FIG. 2D is an illustration depicting an example of console 16 being configured to provide the VR-based augmented reality development functionalities described in this disclosure. In the example illustrated in FIG. 2D, augmented reality content development system 22 is part of console 16, instead of being implemented in HMD 12 as in the examples of FIGS. 2A & 2B and instead of being implemented in peripheral device 42 as in the example of FIG. 2C. In the example of FIG. 2D, augmented reality content development system 22 may implement the VR-based augmented reality tool development capabilities described with respect to FIGS. 2A-2C, but in the context of console 106. As such, whether implemented within HMD 12, within peripheral device 42, or within console 16, augmented reality content development system 22 generates, renders, and updates VR content that reflects physical locations for which augmented reality experiences are being developed, and models the augmented reality experience itself, at the simulated physical locations.

Figure 3A:
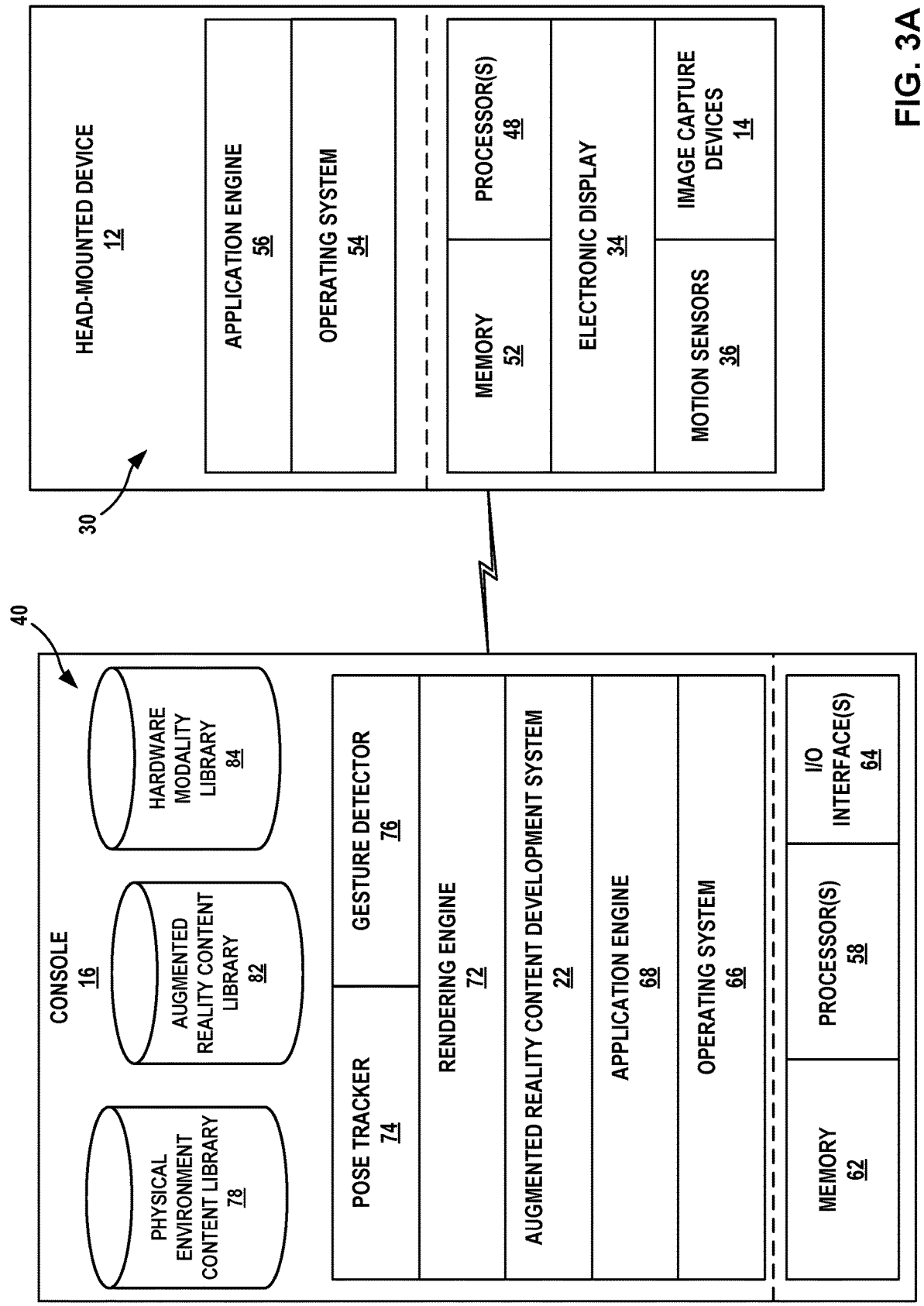
FIGS. 3A-3D are block diagrams showing example implementations of devices of the VR-based augmented development systems of FIGS. 1A-2D.

FIGS. 3A-3D are block diagrams showing example implementations of devices of the VR-based augmented development systems of FIGS. 1A-2D. FIG. 3A is a block diagram showing example implementations of console 16 and head mounted device 12 of FIGS. 1A-2D. In the example of FIG. 3A, console 16 performs VR-based augmented reality experience simulation, user interface (UI) generation, and UI rendering for HMD 12 in accordance with the techniques described herein. Console 16 may edit the UI rendered for HMD 12 in response to various stimuli, such as data sensed at HMD 12. Examples of such sensed data includes motion data and/or image data received from HMD 12, and/or from external sensors.

HMD 12 includes one or more processors 48 and memory 52 that, in some examples, collaboratively provide a computing platform for executing an operating system 54. Operating system 54 may represent an embedded, real-time multitasking operating system, for instance, or may represent any other type of operating system. Operating system 54 provides a multitasking operating environment for executing one or more software components 30, including application engine 56. Processor(s) 48 are coupled to electronic display 34, to motion sensors 36, and to image capture devices 14. In some examples, processor(s) 48 and memory 52 may be separate, discrete components. In other examples, memory 52 may be on-chip memory collocated with processor(s) 48 within a single integrated circuit.

In general, console 16 is a computing device that processes image and tracking information received from cameras 32 (FIG. 1B) and/or HMD 12 to perform gesture detection and user interface generation for HMD 12. In some examples, console 16 is a single computing device, such as a workstation, a desktop computer, a laptop, or gaming system. In some examples, at least a portion of console 16, such as processors 58 and/or memory 62, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3A, console 16 includes one or more processors 58 and memory 62 that, in some examples, collaboratively provide a computing platform for executing an operating system 66. Operating system 66 may represent an embedded, real-time multitasking operating system, for instance, or any other type of operating system. Operating system 66 provides a multitasking operating environment for executing one or more software components 40. Processor(s) 58 may be coupled to one or more input/output (I/O) interfaces 64, which provides one or more interfaces for communicating with individuals or with external devices, such as physical keyboards, game controllers, display devices, image capture devices, HMDs, and the like. Moreover, I/O interfaces 64 may include one or more wired or wireless network interface controllers (NICs) for communicating through a computing network, such as network 18.

Each of processors 48 and 58 may comprise any one or more of a multi-core processor, a controller, a digital signal processor (DSP), an application specific integrated circuit (ASIC), a field-programmable gate array (FPGA), processing circuitry (e.g., fixed function circuitry, programmable circuitry, or any combination of fixed function circuitry and programmable circuitry), or equivalent discrete logic circuitry or integrated logic circuitry. Memory 52 and 62 may comprise any form of memory for storing data and executable software instructions, such as random-access memory (RAM), read only memory (ROM), programmable read-only memory (PROM), erasable programmable read only memory (EPROM), electronically erasable programmable read only memory (EEPROM), and flash memory.

Software applications 40 of console 16 operate to provide an overall VR application that, in turn, provides an IDE for augmented reality development and/or testing. In this example, software applications 40 include application engine 68, augmented reality content development system 22, rendering engine 72, gesture detector 76, and pose tracker 74. In general, application engine 68 includes functionality to provide and present VR environments. Application engine 68 may generate, present, and modify VR environments for various end uses, including for the augmented reality development, execution, and runtime simulation functionalities of this disclosure.

Augmented reality content development system 22 enables application engine 68 to develop, execute, and simulate augmented reality experiences for various end uses, such as for professional training, education, navigation, and the like. Augmented reality development system 22 may include, for example, one or more software packages, software libraries, hardware drivers, Application Program Interfaces (APIs), IDEs, etc. for providing a development and runtime environment for augmented reality experiences at various physical locations, using various hardware modalities configured to provide augmented reality experiences. Responsive to control by application engine 68 and/or augmented reality content development system 22, rendering engine 72 generates 3D VR content for display to developer(s) 8, by application engine 56 of HMD 12.

In some examples, augmented reality content development system 22 may be implemented as a distributed, modular development studio with components executing on any of console 16 and HMD 12. In general, as described above, augmented reality content development system 22 provides a full-featured content development studio for creating augmented reality content for real world environments. That is, augmented reality content development system 22 may include various components executing on processor(s) 58 including a content editor that allows developer 8 to (i) build visual effects including adding an editing objects, (ii) scaling and positioning objects within a 3D environment, (iii) creating and configuring layers for placing objects in front of or behind other objects, (iv) rotating and repositioning objects, (v) creating and controlling placement of animations within the 3D environment, (vi) creating textures, materials and/or meshes for surfaces within the 3D environment, and (vii) creating and defining augmented reality elements for interacting with a user. In addition, Augmented reality content development system 22 includes a VR-based augmented reality simulator that enables the user to preview and experience the effects by processing the augmented reality content to construct and render a VR experience for display by HMD 12 as VR content 26 that simulates the authored augmented reality experience on a target real world environment.

Augmented reality content development system 22 may also enable developer 8 to, in various examples, effect additive lighting using one or more of ambient light, environment light, directional light, spot light, and point light. Augmented reality content development system may add ambient light to add a constant amount of light to all the objects in VR content 26. Augmented reality content development system may add and move any one or more of directional, spot, and point lights to illuminate objects of VR content 26 from different positions. Augmented reality content development system may use environment light to mimics the lighting from a real-world setting, such as the geographical location selected from physical environment content library 78. Augmented reality content development system 22 may apply any one or more of the above-listed lighting effects to illuminate objects in a realistic way, and may perform dimming on any of these lighting effects as a reciprocal operation. In this way, augmented reality content development system 22 may generate VR content 26 to incorporate realistic shadow and depth information at the geographical location selected from physical environment content library 78, with or without specifically selected environmental factors at the geographical location.

Augmented reality content development system 22 may also implement particle systems to create and move numerous objects at the same time, particularly collections of small virtual objects within VR content 26 (e.g., confetti, lighting specs of fireworks, stars, etc.). Augmented reality content development system 22 may apply physics properties to these applied to particles, simulating force, drag, and other kinematic or static properties to emulate the effect of gravity and other physical phenomena at the geographical location selected from physical environment content library. In some examples, augmented reality content development system 22 may implement computing modules using processor(s) 58 to obtain livestreaming information on VR content 26 as it relates to sharing via social media (e.g., between multiple developers 8 in the collaborative setting illustrated in FIG. 1B).

Rendering engine 72 renders VR content 26 of FIGS. 1A and 1B for display to developer 8 in accordance with current pose information for a frame of reference, typically a viewing perspective of HMD 12, as determined by pose tracker 74. Based on the current viewing perspective of HMD, rendering engine 72 constructs the 3D, VR content that simulates the physical environment for which the augmented reality experience is being developed and/or simulated at present. Pose tracker 74 operates on sensed data received from HMD 12. The sensed data may include one or more of movement information (e.g., lateral panning, vertical panning, or rotational movement of the head of developer 8 as indicated by one or more of a pitch, yaw, or roll angle), gaze tracking information (e.g., as sensed by inward-facing camera hardware of image capture devices 14).

In some examples, the sensed data may represent data received from any external sensors 24 shown in FIG. 1, such as external cameras, to capture 3D information within the environment at which developer 8 is positioned. In some such examples, the sensed data may include movement exhibited by developer 8 and/or FoV tracking information with respect to developer 8. Using the sensed data received from HMD 12 and/or external sensors 24, pose tracker 74 determines a current pose, and thereby, the current FoV for the frame of reference of HMD 12 and, in accordance with the current pose, constructs the VR content for communication, via the one or more I/O interfaces 64, to HMD 12 for display to developer 8.

Using the sensed data, gesture detector 76 analyzes tracked motions, configurations, positions, and/or orientations of objects, such as hand 28, or the other hand of developer 8, or of one or more digits thereof, to identify one or more gestures performed by developer 8. Gesture detector 76 may analyzes image data captured by image capture devices 14 of HMD 12 and/or sensors 24 and external cameras 102 to identify a hand or finger movements that correspond to input mechanisms via virtual input mechanisms of VR content 26, such as graphical keyboards or free-form drawings or handwriting input. The gesture-based inputs detected by gesture detector 76 may substitute for, be substituted for, or supplement various types of developer input received via I/O interface(s) 64.

Augmented reality content development system 22 may draw from various data repositories to aid developer 8 in developing, simulating, and modifying an augmented reality experience at a particular physical environment. While augmented reality content development system 22 may access data from repositories both local to console 16/HMD 12 as well as from remote devices (e.g., using network 18), FIG. 3A is discussed herein with respect to data repositories stored locally at console 16, purely for ease of illustration and discussion.

FIG. 3A shows three data repositories implemented locally at console 16, namely, physical environment content library 78, augmented reality content library 82, and hardware modality library 84. Augmented reality content development system 22 may use physical environment content library 78 to obtain data reflecting aspects of the physical environment selected at present for augmented reality experience simulation. Physical environment content library 78 may include visual elements reflecting objects at the selected visual environment, and in some instances, may also include audio data that reflects real-world auditory experiences at the selected physical location. Physical environment content library 78 may be updated periodically to reflect environmental changes at various physical environments available to augmented reality content development system 22 for augmented reality experience modeling. Applied to the examples of FIGS. 1A and 1B, physical environment content library 78 may include visual representations of the buildings, street signs, etc. shown in VR content 26.

Augmented reality content library 82 may include various virtual objects that a user might potentially use to augment the view (or auditory experience) at the physical environment selected from physical environment content library 78. Augmented reality content 6 shown in FIGS. 1A and 1B is an example (or alternatively, shows a grouping of individual examples) of virtual augmentation elements that developer 8 may select from augmented reality content library 82 to model hypothetical augmented reality experiences at the physical environment selected from physical environment library 78.

In the example of FIG. 3A, console 16 also includes hardware modality library 84. Hardware modality library 84 may include masking information that augmented reality content development system 22 can apply to VR content 26 and augmented reality content 6 to more closely simulate the visual output of the augmented reality system that a user might use at the physical environment during the augmented reality experience. For example, augmented reality content development system 22 may use an input received from developer 8 to select a particular hardware modality with respect to which the augmented reality experience under development is to be simulated for testing purposes.

For example, augmented reality content development system 22 may simulate additive lighting across VR content 26, to more accurately simulate the lens and/or display capabilities of the device for which the augmented reality experience is being modeled. Conversely, augmented reality content development system 22 may implement global dimming (e.g., by negating photons on an all-view basis) or local dimming (e.g., by negating photons on a pixel-by-pixel basis) to simulate various viewing adjustments that the end user might avail of when using the selected hardware modality for an augmented reality experience.

In some examples, augmented reality content development system 22 may replicate waveguide artifacts (e.g., rainbow patterns or other trailing patterns) that the selected hardware modality might produce as part of the prototyped augmented reality experience, based on environmental factors or other factors at the physical environment represented in VR content 26. In some examples, augmented reality content development system 22 may enable developer 8 to toggle between one-eye and two-eye views, or toggle between left-eye and right-eye views of VR content 26 in prototyping augmented reality experience 4 with respect to various hardware modalities. Examples of devices for which hardware modality library 84 may include masking information include augmented reality headsets (e.g., which might be similar to HMD 12 of FIGS. 2B & 2C in some examples, and different from HMD 12 in other examples), tablet computers, smartphones, etc.

It will be appreciated that hardware modality library 84 may include masking information that reflects the image capture and/or display capabilities of devices that are currently on the market, devices that are under development but not yet on the market, and for devices that could hypothetically be developed in the future. In this way, augmented reality content development system 22 may enable developer 8 to model future augmented reality experiences that are created using a variety of different devices, including devices that might only be available to users hypothetically. Additionally, while described primarily herein with respect to visual elements at the target geographical location, it will be appreciated that augmented reality content development system 22 may also emulate haptics and/or auditory (sound) experiences using VR content 26 and augmented reality 6 as well, in accordance with aspects of this disclosure.

Figure 3B:
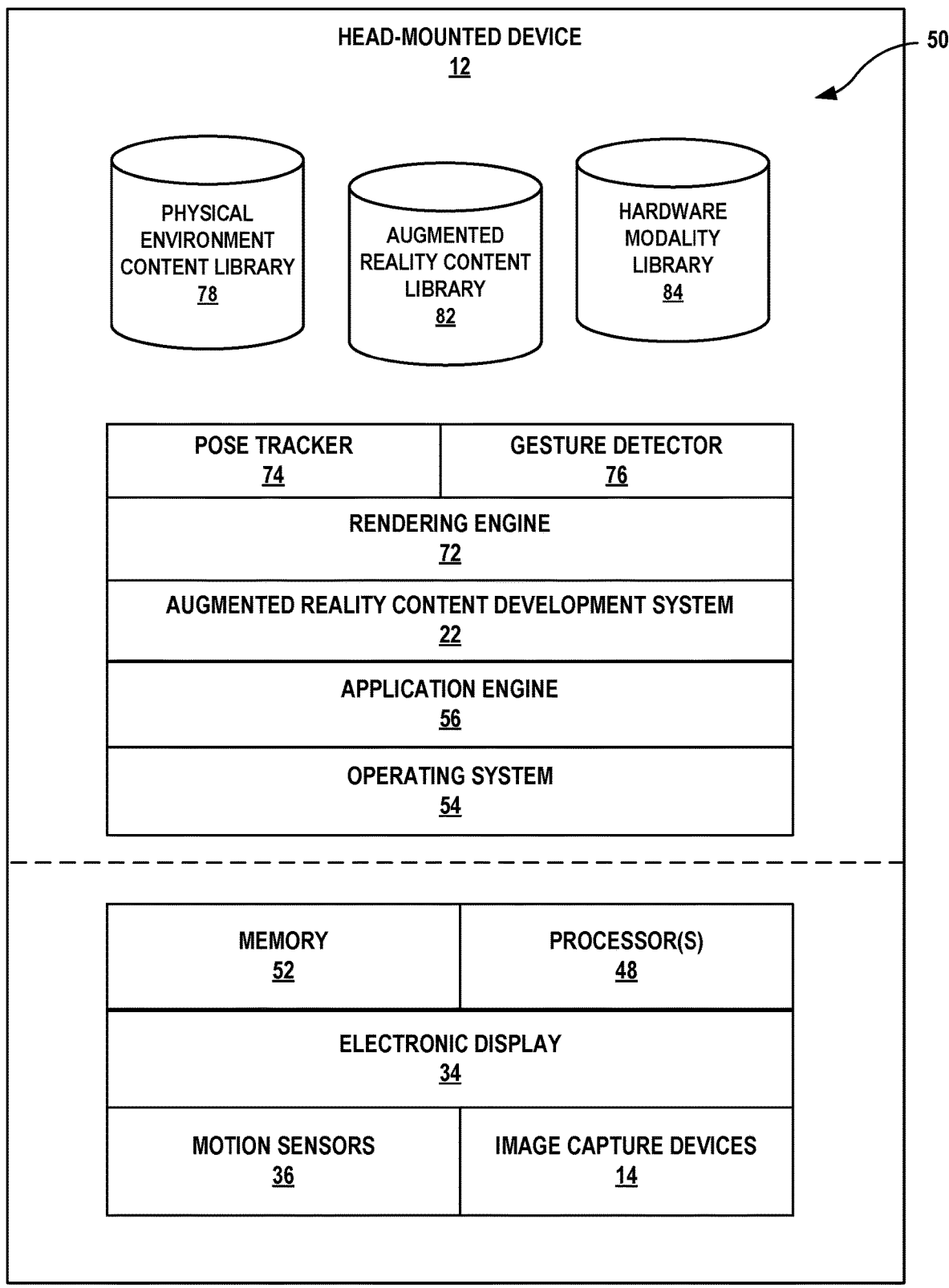

FIG. 3B is a block diagram depicting an example in which HMD 12 is equipped to perform the VR-based augmented reality experience development and simulation techniques of this disclosure. That is, in the example illustrated in FIG. 3B, software components 50 of HMD 12 include augmented reality content development system 22, pose tracker 74, gesture detector 76, physical environment content library 78, augmented reality content library 82, and hardware modality library 84. In the example of FIG. 3B, developer 8 may use application engine 56 to develop, execute, and simulate augmented reality experiences for various end uses, such as for professional training, education, navigation, and the like. Although illustrated within the context of HMD 12 in FIG. 3B, augmented reality content development system 22, pose tracker 74, gesture detector 76, physical environment content library 78, augmented reality content library 82, and hardware modality library 84 function in a similar manner to the manner described above with respect to the example of FIG. 3A, and are not described separately with respect to the example of FIG. 3B, for the sake of brevity.

Figure 3C:
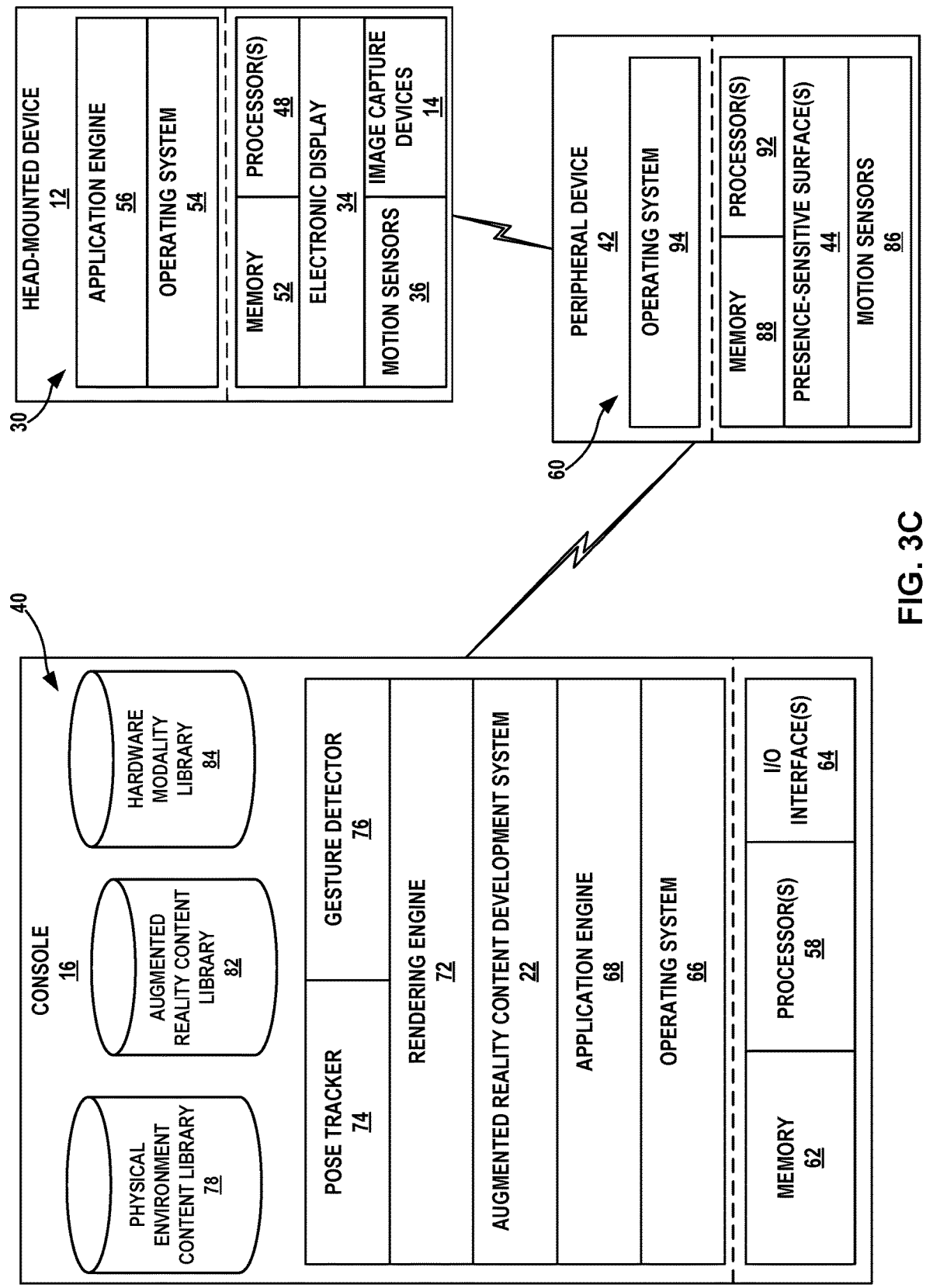

FIG. 3C is a block diagram depicting an example in which HMD 12 communicates with console 16 via peripheral device 42 shown in FIG. 2C. In the example of FIG. 3C, console 16 is configured to perform the VR-based augmented reality development and simulation (as in the example of FIG. 3A). In the example of FIG. 3C, peripheral device 42 may offload portions of the computing tasks otherwise performed by HMD 12, thereby enabling a reduced hardware infrastructure and therefore a lower-profile form factor with respect to the design of HMD 12.

Peripheral device 42 includes motion sensors 86, presence-sensitive surface(s) 44 (which represent an example of surface 44 shown in FIG. 2C), memory 88, and one or more processors 92. Memory 88 and processor(s) 92 may collectively form control unit 38 illustrated in FIG. 2C. software components 60 of peripheral device 42 include operating system 94, which provides a multitasking operating environment for software execution.

Figure 3D:
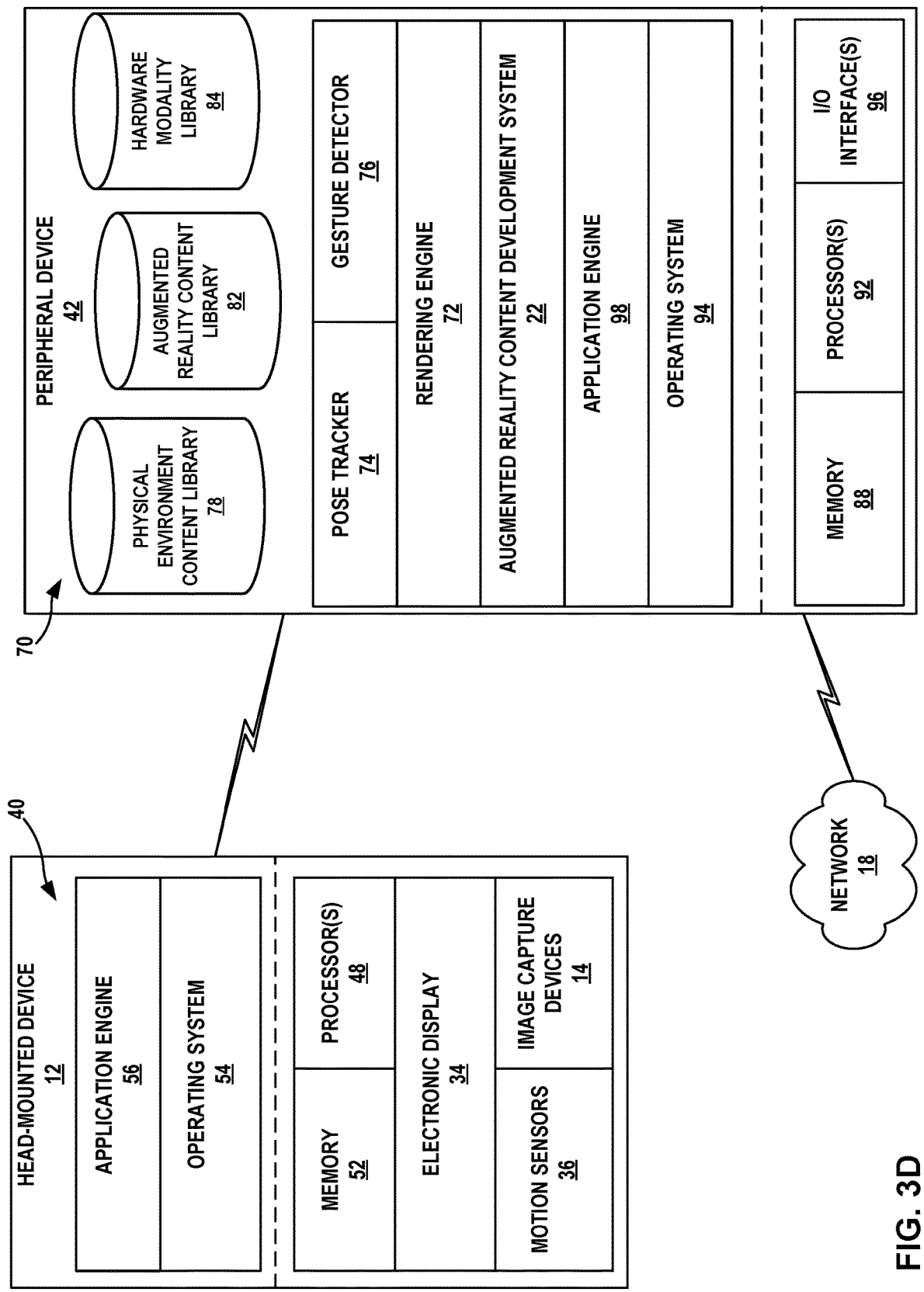

FIG. 3D is a block diagram depicting an example in which peripheral device 42 is equipped to perform the VR-based augmented reality experience development and simulation techniques of this disclosure. In the example of FIG. 3D, peripheral device 42 includes the components illustrated in FIG. 3C, and also includes one or more I/O interfaces 96. I/O interface(s) may include presence-sensitive surface(s) 44 of FIG. 3C, in addition to other input and/or output devices and/or network interfaces.

In the example FIG. 3D, software components 70 of peripheral device 42 include application engine 98. Developer 8 may invoke application engine 56 to develop, execute, and simulate augmented reality experiences for various end uses, such as for professional training, education, navigation, and the like. In the example illustrated in FIG. 3D, software components 70 of peripheral device 42 include augmented reality content development system 22, pose tracker 74, gesture detector 76, physical environment content library 78, augmented reality content library 82, and hardware modality library 84.

In the example of FIG. 3D, augmented reality content development system 22 may enable application engine 56 to develop, execute, and simulate augmented reality experiences for various end uses, such as for professional training, education, navigation, and the like. Although shown within the context of peripheral device 42 in FIG. 3D, augmented reality content development system 22, pose tracker 74, gesture detector 76, physical environment content library 78, augmented reality content library 82, and hardware modality library 84 function in a similar manner to the manner described above with respect to the examples of FIGS. 3A-3C, and are not described separately with respect to the example of FIG. 3B, for the sake of brevity.

Figure 4A:
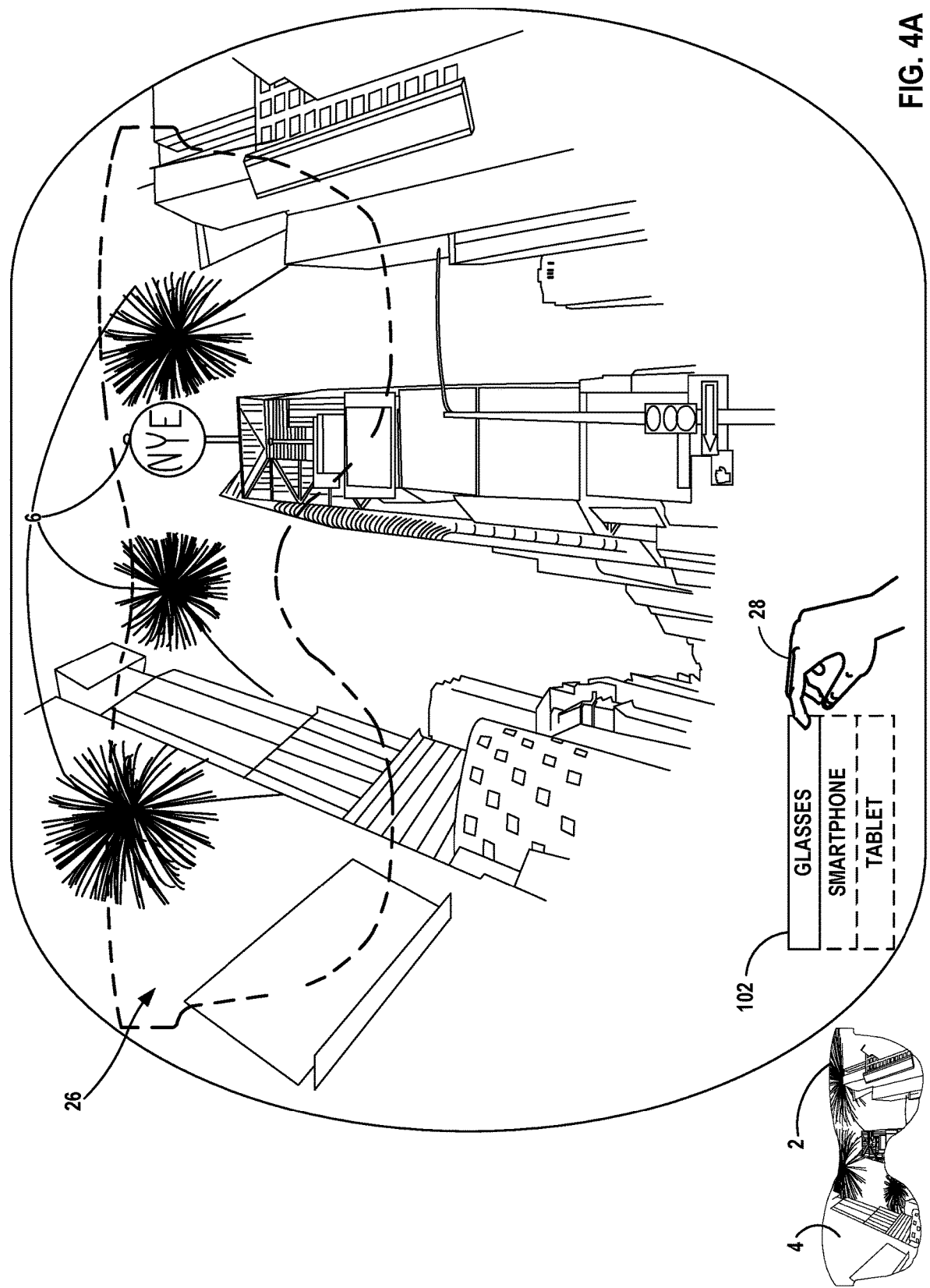
FIGS. 4A-4C are conceptual diagrams illustrating augmented reality experience simulations of this disclosure based on different selections of end-user hardware modalities.
Figure 4B:
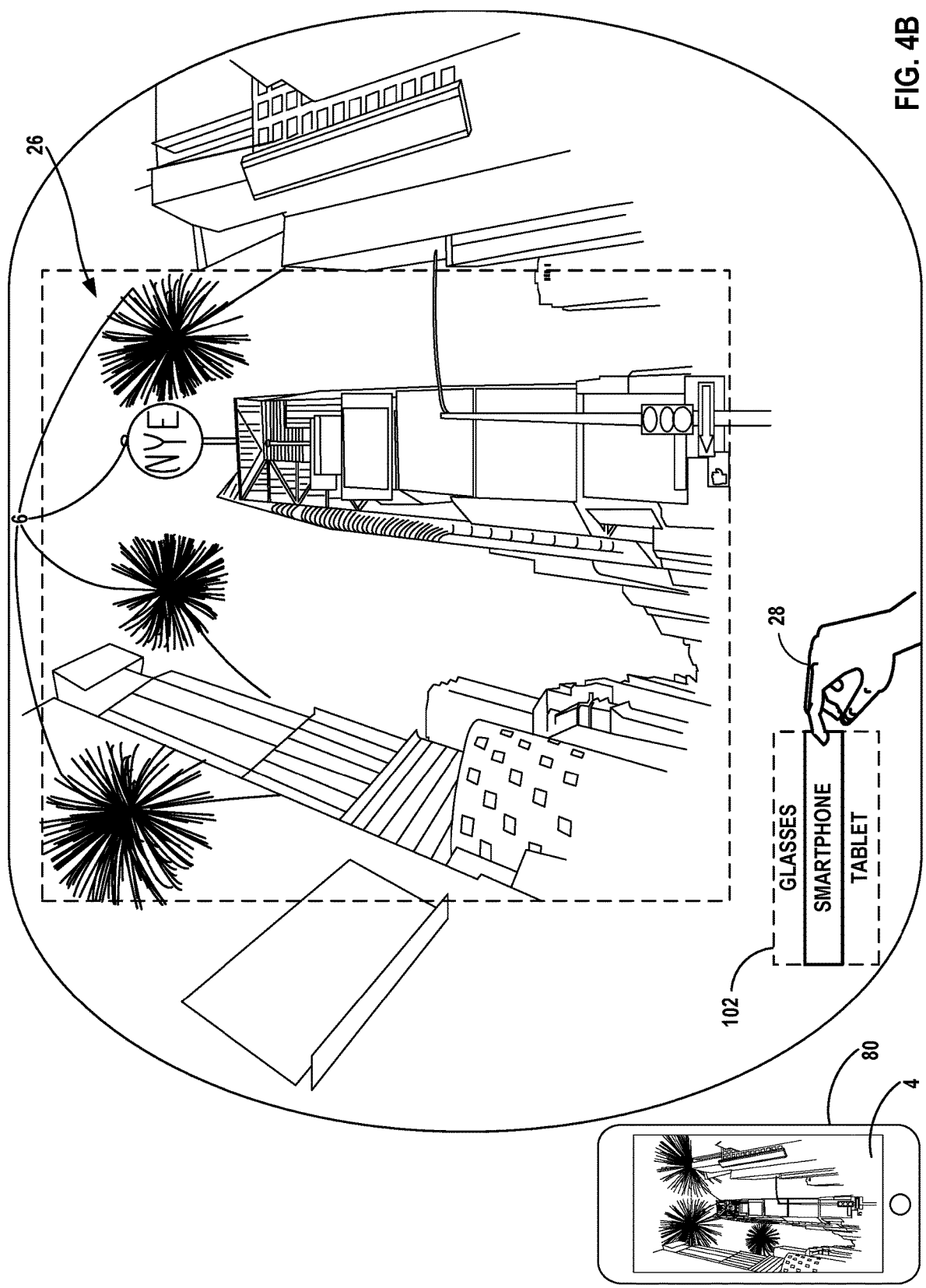
Figure 4C:
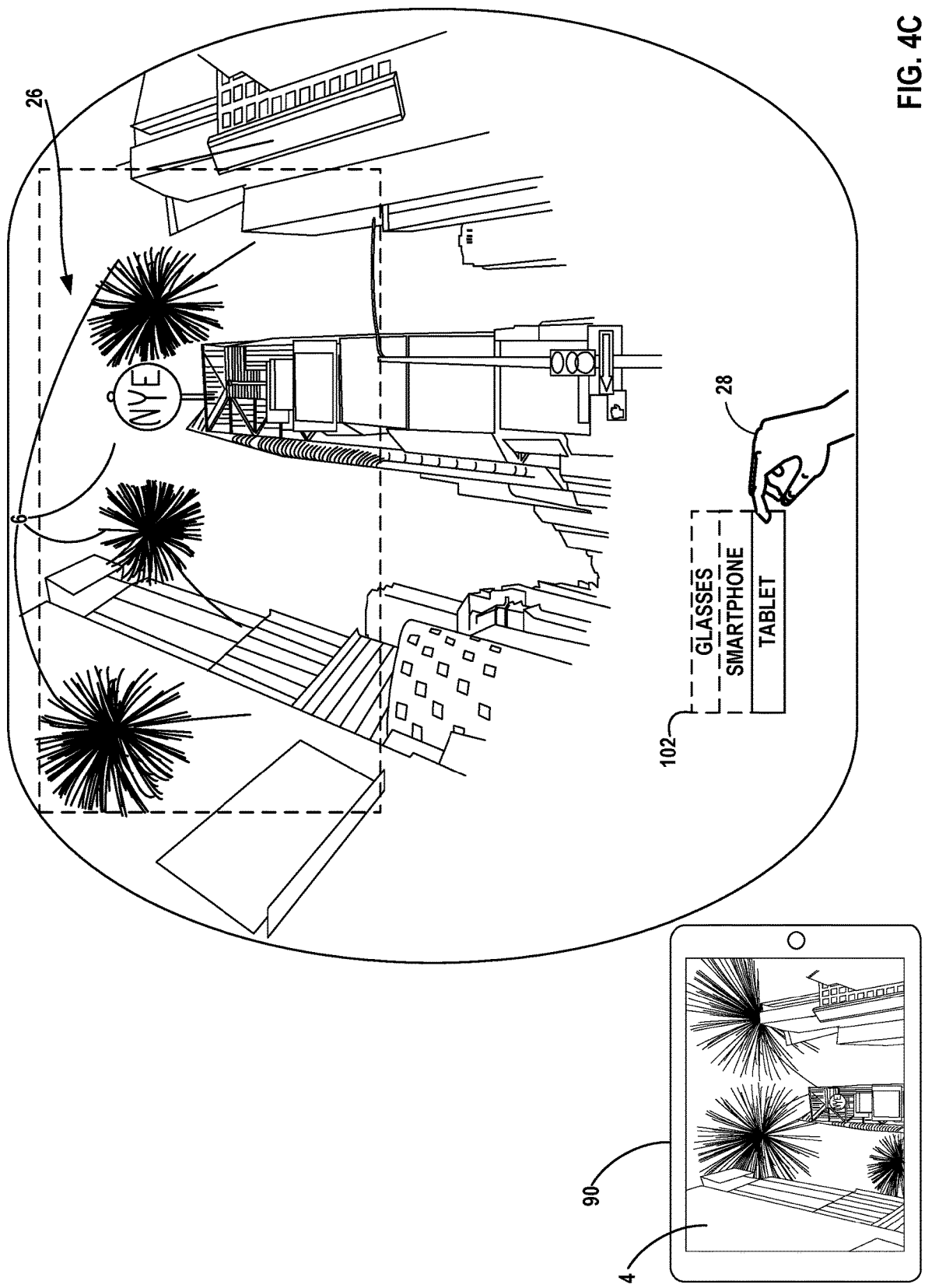

FIGS. 4A-4C are conceptual diagrams illustrating augmented reality experience simulations of this disclosure based on different selections of end-user hardware modalities. FIG. 4A illustrates augmented reality experience 4 that is built based on VR content 26 and conforms to the capabilities of augmented reality glasses 2 shown in FIGS. 1A and 1B. FIG. 4B illustrates augmented reality experience 4 that is built based on VR content 26 and conforms to various features of a smartphone equipped with augmented reality capabilities. FIG. 4C illustrates augmented reality experience 4 that is built based on VR content 26 and conforms to various features of a tablet computer equipped with augmented reality capabilities.

Augmented reality content development system 22 may enable developer 8 to select the particular hardware modality (e.g., from hardware modality library 84) by providing input via a GUI element overlaid over VR content 26, according to some implementations of the techniques of this disclosure. In the each of the examples illustrated in FIGS. 4A-4C (collectively, "FIGS. 4"), augmented reality content development system 22 causes rendering engine 72 to superimpose modality selection menu 102 over VR content 26.

In the example of FIG. 4A, augmented reality content development system 22 receives an input indicating that "glasses" are selected as the hardware modality for the augmented reality experience presently being simulated at the physical environment represented by VR content 26 having augmented reality content 6 overlaid. That is, the target device for which augmented reality experience 4 is being developed and authored in the example of FIG. 4A is augmented reality glasses 2. As such, FIG. 4A illustrates a scenario in which augmented reality content development system 22 enables developer 8 to generate VR content 26 overlaid with augmented reality content 6 to emulate augmented reality experience 4, as it may be experienced by a future end-user using augmented reality glasses 2 at the physical environment represented by VR content 26.

In the example of FIG. 4B, augmented reality content development system 22 receives an input indicating that a "smartphone" is selected as the hardware modality for the augmented reality experience presently being simulated at the physical environment represented by VR content 26. That is, the target device for which augmented reality experience 4 is being developed and authored in the example of FIG. 4B is smartphone 80, which may represent a smartphone equipped with augmented reality capabilities. FIG. 4B thus illustrates a scenario in which augmented reality content development system 22 enables developer 8 to generate VR content 26 overlaid with augmented reality content 6 to emulate augmented reality experience 4, as it may be experienced by a future end-user using smartphone 80 at the physical environment represented by VR content 26.

In the example of FIG. 4C, augmented reality content development system 22 receives an input indicating that a "tablet" (or tablet computer) is selected as the hardware modality for the augmented reality experience presently being simulated at the physical environment represented by VR content 26. That is, the target device for which augmented reality experience 4 is being developed and authored in the example of FIG. 4C is tablet computer 90. FIG. 4C thus illustrates a scenario in which augmented reality content development system 22 enables developer 8 to generate VR content 26 overlaid with augmented reality content 6 to emulate augmented reality experience 4, as it may be experienced by a future end-user using tablet computer 90 at the physical environment represented by VR content 26.

While each modality type is illustrated in FIG. 4 as corresponding to only a single menu item (purely for ease of illustration and discussion), it will be appreciated that augmented reality content development system 22 may structure modality selection menu to accommodate multiple makes and models of each modality type. For instance, modality selection menu 102 may include multiple types of augmented reality glasses, which may or may not always include augmented reality glasses 2 of FIGS. 1A, 1B, and 4A. As another example, modality selection menu 102 may include multiple types of smartphones, which may or may not include smartphone 80 of FIG. 4B in all instances. As another example still, modality selection menu 102 may include multiple types of tablet computers, which may or may not include tablet computer 90 in all instances. In these and other examples, modality selection menu may include other types of target devices, and/or multiple types thereof, based on modality model information available from hardware modality library 84. Moreover, augmented reality content development system 22 may include options in modality selection menu 102 to simulate the capabilities of speculative hardware modalities, which are hardware modalities that are not yet available.

In each of FIG. 4, the selected item of modality selection menu 102 is shown with a solid-line border, while the unselected items of modality selection menu 102 are shown with dashed-line borders. FIG. 4 illustrate examples in which developer 8 selects an item from modality selection menu 102 by providing a virtual touch input using hand 28. In other implementations, augmented reality content development system 22 may enable developer 8 to select an item from modality selection menu 102 by providing other types of input, such as touch input using a stylus, spoken inputs (which augmented reality content development system 22 may process using speech recognition tools), typed inputs (which augmented reality content development system 22 may receive via a virtual or physical keyboard), mouse clicks, etc. It will be appreciated that each of FIG. 4 illustrates a scenario in which electronic display 34 of HMD 12 displays a virtual representation of hand 28 within the virtual environment that includes VR content 26 and modality selection menu 102.

Augmented reality content development system 22 may generate augmented reality experience 4 in each of FIG. 4 based on various capabilities of the selected hardware modality. For instance, augmented reality content development system 22 may generate simulated augmented reality experiences 4 to reflect, as closely as possible, a volumetric real-world experience that an augmented reality user could potentially create at the physical environment represented in VR content 26, using the hardware/software package presently-selected from modality selection menu 102.

Augmented reality content development system 22 may adjust various factors, such as global and/or local lighting (e.g. brightening or dimming) based on the lens architecture of the selected hardware modality, the zoom levels based on various features of the selected hardware modality, the display architecture of the selected hardware modality, etc.

For example, augmented reality content development system 22 may adjust augmented reality experience 4 based on focal lengths of the image capture hardware of the selected modality, and/or adjust the output based on display resolutions (e.g., pixel density, 3D vs. 2D capabilities, etc.) of the selected modality, etc.

Figure 5:
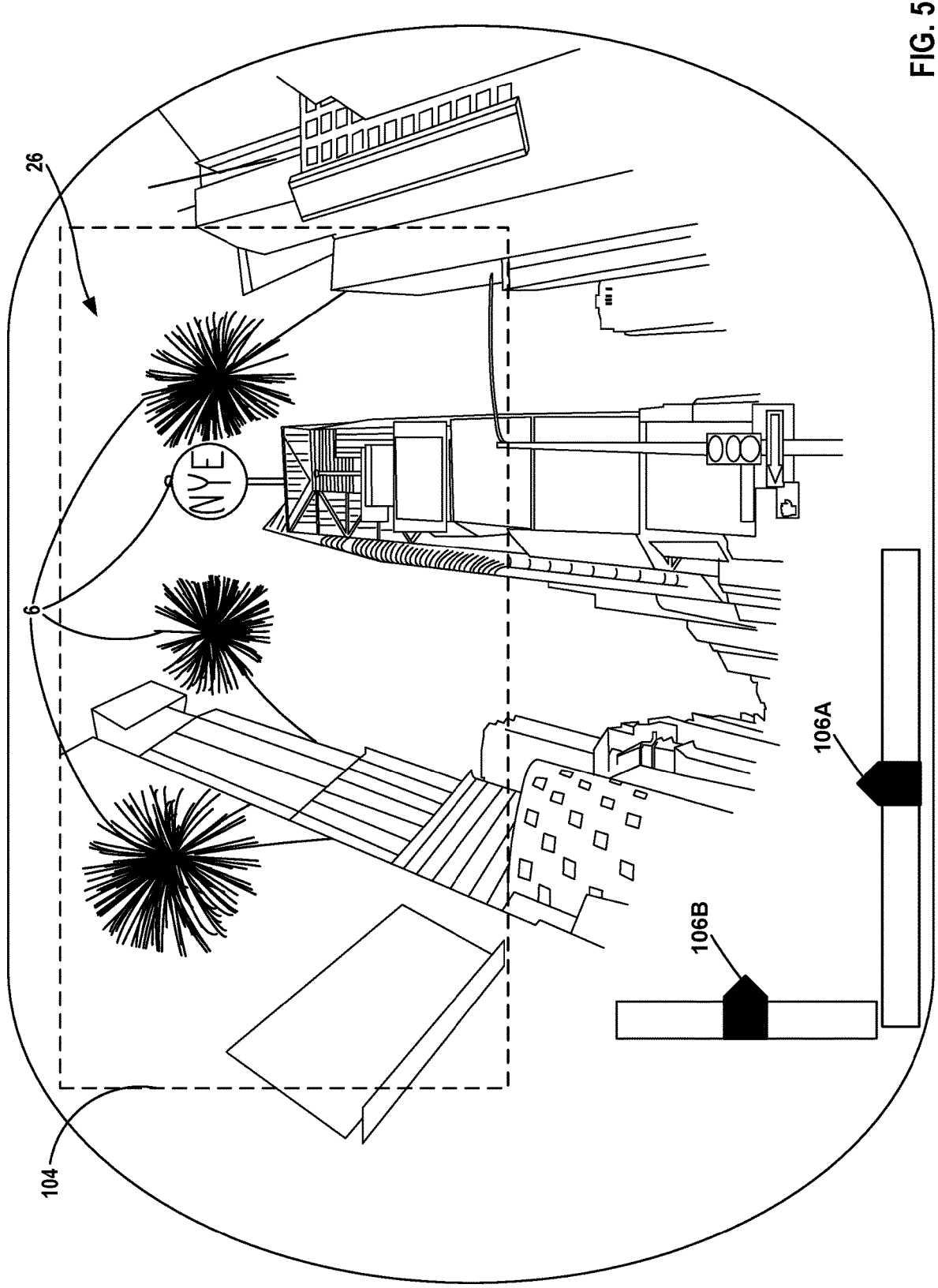
FIG. 5 is a conceptual diagram illustrating viewing adjustment capabilities of augmented reality content development system 22.

FIG. 5 is a conceptual diagram illustrating viewing adjustment capabilities of augmented reality content development system 22. In the example of FIG. 5, augmented reality content development system 22 causes rendering engine 72 to overlay scroll bars over VR content 26. Augmented reality content development system 22 may receive input (e.g., touch-and-drag, click-and-drag, etc.) along each of the overlaid scroll bars. In response to receiving such inputs indicating movement along one of the overlaid scroll bars, augmented reality content development system 22 may move viewing window 104 to include a different portion of VR content 26.

For example, augmented reality content development system 22 may move viewing window 104 laterally (e.g., along a horizontal or 'x' axis of VR content 26) based on receiving a drag input with respect to panning handle 106A along the horizontal scroll bar. As another example, augmented reality content development system 22 may move viewing window 104 vertically (e.g., along a vertical or 'y' axis of VR content 26) based on receiving a drag input with respect to tilt handle 106B along the vertical scroll bar.

Augmented reality content development system 22 may use viewing window 104 for various purposes, such as to reflect the display height and width of the presently-selected modality under simulation to represent an "active" development area with respect to which developer 8 can perform development/authoring tasks at the present time, etc. In other examples, augmented reality content development system 22 may cause rendering engine 72 to overlay other types of window-adjusting GUI elements over VR content 26 in addition to or instead of panning handle 106A and/or tilt handle 106B. Augmented reality content development system 22 may use input provided along these other window-adjusting GUI elements to zoom, dolly, or pedestal viewing window 104 within VR content 26, to rotate viewing window 104, or to otherwise adjust the position of or the subset of VR content 26 displayed within viewing window 104.

Figure 6:
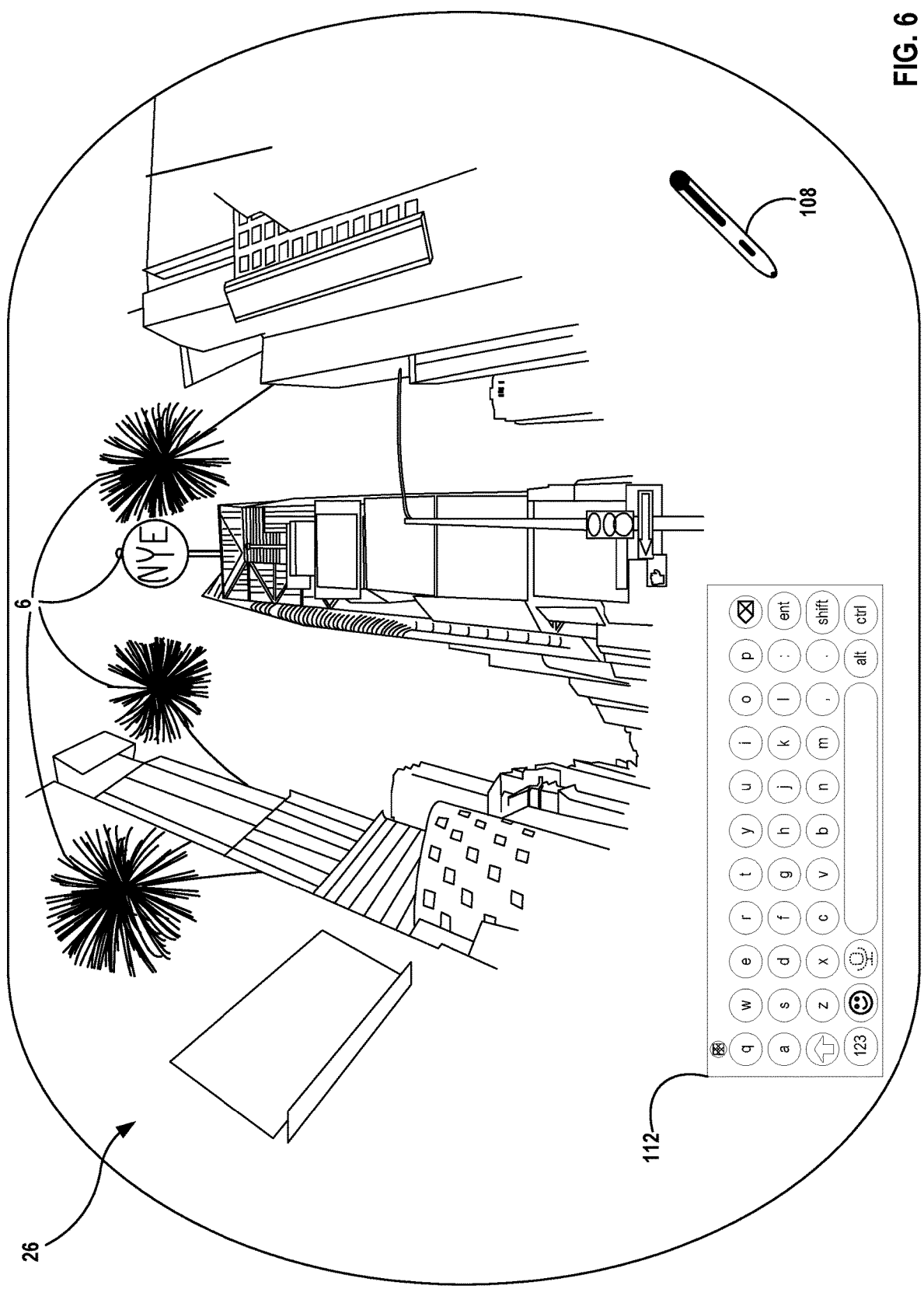
FIG. 6 is a conceptual diagram illustrating VR-based authoring and annotation tools of this disclosure.

FIG. 6 is a conceptual diagram illustrating VR-based authoring and annotation tools of this disclosure. In the example of FIG. 6, augmented reality content development system 22 causes rendering engine 72 to present virtual stylus 108 and virtual keyboard 112 as overlays with respect to VR content 26. While both of virtual stylus 108 and virtual keyboard 112 are shown in conjunction in FIG. 6, it will be appreciated that augmented reality content development system 22 may, in some examples, cause rendering engine 72 to render just one of virtual stylus 108 or virtual keyboard 112 at a given time over VR content 26.

Augmented reality content development system 22 may receive annotation or authoring input based on movement of virtual stylus 108. In some examples, augmented reality content development system 22 may implement handwriting recognition to convert free-form input received via movement of virtual stylus 10 to text input. In other examples, augmented reality content development system 22 may superimpose free-form input received via movement of virtual stylus 108 as free-form annotations over VR content 26. In some examples, augmented reality content development system 22 may receive text input via typing input provided at a virtual location corresponding to that of virtual keyboard 112.

Augmented reality content development system 22 may use the inputs received via virtual stylus 108 and/or virtual keyboard 112 for various purposes. In the use case scenario shown in FIG. 2B, augmented reality content development system 22 may use the annotation or authoring inputs to assist in collaboration between developers 8, by enabling developers 8 to communicate instructions or notes for either asynchronous or synchronous collaboration. In other examples, augmented reality content development system 22 may use the inputs received via virtual stylus 108 and/or virtual keyboard 112 to implement development and authoring tasks, thereby enabling developer 8 to provide development/authoring input using GUI elements.

In this way, augmented reality content development system 22 implements the techniques of this disclosure to model or prototype augmented reality experiences that can be developed, modified, and reused across different locations (different physical environments), and across different hardware modalities. In this way, augmented reality content development system 22 enables the developer 8 to visualize how the augmented reality experience would look via that particular modality, and may adjust for various factors that may be variable at the time of a future augmented reality experience.

Figure 7:
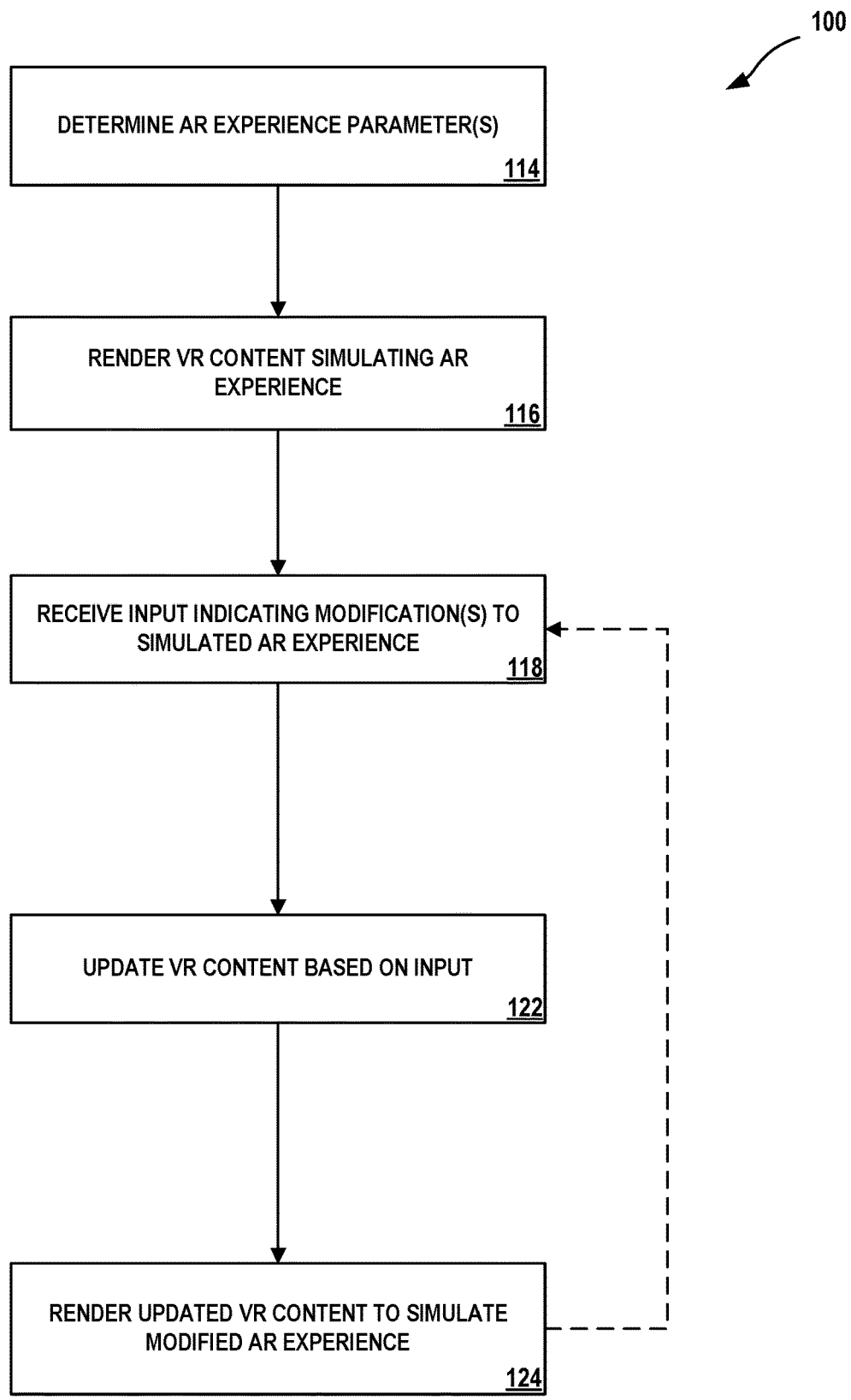
FIG. 7 is a flowchart illustrating an example process that an augmented reality content development system of this disclosure may perform, in accordance with aspects of this disclosure.

FIG. 7 is a flowchart illustrating an example process 100 that augmented reality content development system 22 may perform, in accordance with aspects of this disclosure. Process 100 may begin with augmented reality content development system 22 determining one or more augmented reality experience parameters (100). For example, augmented reality content development system may determine the target device for which the augmented reality experience is to be prototyped (e.g., any of augmented reality glasses 2, smartphone 80, tablet computer 90, etc.), the real-world physical environment to be modeled in VR content 26, and potentially, one or more other parameters as well.

In turn, augmented reality content development system 22 may cause rendering engine 72 to render VR content 26 with augmented reality content 6, thereby simulating augmented reality experience 4 (116). That is, augmented reality content development system 22 may apply the parameters received at step 114 to generate VR content 26 and augmented reality content 6, thereby simulating augmented reality experience 4 at the real-world physical environment represented in VR content 26, based on various capabilities (e.g., display capabilities) of the selected target device as available from hardware modality 84.

Augmented reality content development system 22 may receive input indicating one or more modifications to augmented reality experience 4 as simulated by VR content 26 with augmented reality content 6 (118). For instance, augmented reality content development system 22 may use/invoke one or more of I/O interface(s) 64, pose tracker 74, gesture detector 76, or other components illustrated in FIGS. 3A-3D to obtain/recognize input from developer 8. In turn, augmented reality content development system 22 may interpret the received input to determine one or more modifications to augmented reality experience 4, based on instructions received from developer 8, a change in the FoV of developer 8 based on a shift indicated by the pose of developer 8, etc.

In turn, augmented reality content development system 22 may update VR content 26 based on the received input (122). As described herein, any updates to VR content 26 performed by augmented reality content development system 22 encompass updates to the representation of the selected real-world physical environment shown in VR content 26 and/or to augmented reality content 6 to emulate augmented reality experience 4 via HMD 12. Augmented reality content development system 22 may cause rendering engine 72 to render an updated version of VR content 26 (e.g., with augmented reality content 6) to simulate the modified augmented reality experience (124). In some instances, augmented reality system 22 may receive additional input indicating further modifications to the modified augmented reality experience, thereby effectively returning to step 118. The optional nature of iterating steps 118-122 multiple times is illustrated in FIG. 7 using a dashed-line transition.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), processing circuitry (e.g., fixed function circuitry, programmable circuitry, or any combination of fixed function circuitry and programmable circuitry), or any other equivalent integrated logic circuitry or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media. The VR systems of this disclosure may be implemented on various platforms, including a head-mounted device (HMD) connected to a host computer system, a standalone HMD, a mobile device, or computing system, or any other hardware platform capable of providing VR content to one or more viewers.

What is claimed is:

1. A virtual reality (VR) system for developing augmented reality content, the system comprising:
    a head-mounted device (HMD) configured to output VR content representing a remote physical environment for an augmented reality experience, the remote physical environment remote from the location of the HMD;
    an augmented reality content development system comprising processing circuitry configured to:
        obtain, from a physical environment content library stored on computer-readable media, the VR content representing a user-selected remote physical environment, and
        identify, based on first input, augmented reality content with which to augment the VR content to construct the augmented reality experience for the user-selected remote physical environment;
        select, based on second input received from a user via the HMD, an augmented reality hardware modality identifying a target device having a different form factor from the HMD; and
    a rendering engine comprising processing circuitry configured to render, in accordance with characteristics of the target device, via the HMD, the VR content representing the remote physical environment, augmented with the augmented reality content.

2. The VR system of claim 1,
    wherein the augmented reality content development system is further configured to process third input to select at least one of a geographical location corresponding to the remote physical environment represented in the VR content, a viewing angle within the remote physical environment represented in the VR content, or an environmental factor within the remote physical environment represented in the VR content, and
    wherein the rendering engine is further configured to update the VR content representing the remote physical environment augmented with the augmented reality content based on the selection processed from the third input.

3. The VR system of claim 2, wherein the rendering engine is further configured to render a graphical user interface (GUI) element that enables the selection processed from the third input.

4. The VR system of claim 3, further comprising a pose tracker comprising processing circuitry configured to identify field of view (FoV) information associated with the HMD.

5. The VR system of claim 1, wherein the augmented reality content development system is integrated within the HMD.

6. The VR system of claim 1, wherein the augmented reality content development system executes on processing circuitry that is separate from the HMD.

7. The VR system of claim 1, further comprising a gesture detector comprising processing circuitry configured to identify, from image data received from the HMD, one or more gestures, wherein the augmented reality content development system is further configured to modify, in response to the one or more gestures identified by the gesture detector, the augmented reality content with which to augment the remote physical environment for the augmented reality experience to form updated VR content, and wherein the rendering engine is configured to render the updated VR content via the HMD.

8. The VR system of claim 1, further comprising a gesture detector configured to identify, from image data received from the HMD, one or more gestures, wherein the augmented reality content development system is further configured to annotate, in response to the one or more gestures identified by the gesture detector, the VR content to form annotated VR content, and wherein the rendering engine is configured to render the annotated VR content via the HMD.

9. The VR system of claim 1, wherein the augmented reality content development system is further configured to at least one of: (i) add one or more augmented reality objects to the augmented reality content, (ii) edit one or more augmented reality objects of the augmented reality content, (iii) scale the augmented reality content, (iv) reposition the augmented reality content, (v) configure one or more layers for augmented reality object placement within the augmented reality content, (vi) rotate one or more augmented reality objects of the augmented reality content, or (vii) control placement of one or more animations of the augmented reality content.

10. The VR system of claim 1, wherein the augmented reality hardware modality comprises one of augmented reality glasses, smartphone, and tablet computer.

11. The VR system of claim 10, wherein the augmented reality content development system is further configured to simulate a capability of the augmented reality hardware modality.

12. The VR system of claim 1, wherein the augmented reality content development system is further configured to apply masking to the VR content and augmented reality content based, at least in part, on the augmented reality hardware modality.

13. The VR system of claim 1, wherein the augmented reality content development system is further configured to adjust one or more factors in accordance with a lens architecture of the target device.

14. The VR system of claim 13, wherein the one or more factors include one or more of global lighting, local lighting, global dimming, or local dimming.

15. The VR system of claim 13, wherein the one or more factors include one or more of a focal length of the lens architecture or waveguide artifacts.

16. The VR system of claim 1, further wherein the rendering engine is further configured to update the VR content representing the remote physical environment augmented with the augmented reality content to add or remove lighting based on lighting contributed by the augmented reality content.

17. The VR system of claim 1, wherein the rendering engine is further configured to adjust the background lighting of the VR content representing the remote physical environment augmented with the augmented reality content to account for changes in daylight based on a future time.

* * * * *